United States Patent
Shaffer, II et al.

(10) Patent No.: US 10,141,598 B2
(45) Date of Patent: *Nov. 27, 2018

(54) REINFORCED BIPOLAR BATTERY ASSEMBLY

(71) Applicant: ADVANCED BATTERY CONCEPTS, LLC, Clare, MI (US)

(72) Inventors: Edward O. Shaffer, II, Midland, MI (US); Donald Hobday, Dover (GB)

(73) Assignee: ADVANCED BATTERY CONCEPTS, LLC, Clare, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/359,289

(22) Filed: Nov. 22, 2016

(65) Prior Publication Data
US 2017/0077545 A1 Mar. 16, 2017

Related U.S. Application Data

(63) Continuation-in-part of application No. 15/070,117, filed on Mar. 15, 2016, which is a
(Continued)

(51) Int. Cl.
*H01M 10/04* (2006.01)
*H01M 2/10* (2006.01)
(Continued)

(52) U.S. Cl.
CPC ..... *H01M 10/0418* (2013.01); *H01M 2/1016* (2013.01); *H01M 2/1072* (2013.01);
(Continued)

(58) Field of Classification Search
None
See application file for complete search history.

(56) References Cited

U.S. PATENT DOCUMENTS

| | | | |
|---|---|---|---|
| 1,712,897 | A | 5/1929 | Morrison |
| 3,522,104 | A | 7/1970 | Biddick |

(Continued)

FOREIGN PATENT DOCUMENTS

| | | | |
|---|---|---|---|
| CH | 248315 | A | 4/1947 |
| CN | 101379652 | A | 3/2009 |

(Continued)

OTHER PUBLICATIONS

Preliminary Rejection from the Korean Intellectual Property Office for Application No. 10-2016-7029627, dated Jan. 18, 2017.
(Continued)

*Primary Examiner* — Ula C Ruddock
*Assistant Examiner* — Tony S Chuo
(74) *Attorney, Agent, or Firm* — The Dobrusin Law Firm, P.C.; Daniela M. Thompson-Walters

(57) ABSTRACT

An article having (a) one or more stacks of a plurality of electrode plates include: (i) one or more bipolar plates having a substrate having an anode on one surface and a cathode on an opposing surface; (ii) a separator and a liquid electrolyte located between each of the electrode plates; (b) a first end plate having a first end plate internal reinforcement structure, attached at an end of the one or more stacks; (c) a second end plate having a second end plate internal reinforcement structure, attached at an opposing end of the one or more stacks as the first end plate; wherein the first end plate and the second end plate reinforce the plurality of electrode plates during a charge cycle, a discharge cycle, or both the charge cycle and the discharge cycle.

20 Claims, 4 Drawing Sheets

Related U.S. Application Data continuation-in-part of application No. 14/345,321, filed as application No. PCT/US2012/033744 on Apr. 16, 2012.

(60) Provisional application No. 62/424,809, filed on Nov. 21, 2016, provisional application No. 61/550,657, filed on Oct. 24, 2011.

(51) Int. Cl.

| | | |
|---|---|---|
| *H01M 2/24* | (2006.01) | |
| *H01M 2/12* | (2006.01) | |
| *H01M 2/14* | (2006.01) | |
| *H01M 2/16* | (2006.01) | |
| *H01M 2/18* | (2006.01) | |
| *H01M 2/36* | (2006.01) | |
| *H01M 10/0525* | (2010.01) | |
| *H01M 10/6557* | (2014.01) | |
| *H01M 10/613* | (2014.01) | |
| *H01M 4/02* | (2006.01) | |

(52) U.S. Cl.
CPC ............ *H01M 2/12* (2013.01); *H01M 2/145* (2013.01); *H01M 2/1613* (2013.01); *H01M 2/1653* (2013.01); *H01M 2/18* (2013.01); *H01M 2/24* (2013.01); *H01M 2/36* (2013.01); *H01M 10/0525* (2013.01); *H01M 10/613* (2015.04); *H01M 10/6557* (2015.04); *H01M 2004/029* (2013.01)

(56) References Cited

U.S. PATENT DOCUMENTS

| | | | |
|---|---|---|---|
| 4,008,099 A | 2/1977 | Lindstrom | |
| 4,098,967 A | 7/1978 | Biddick | |
| 4,510,219 A | 4/1985 | Rowlette | |
| 4,542,082 A | 9/1985 | Rowlette | |
| 4,637,970 A | 1/1987 | Yeh | |
| 4,658,499 A | 4/1987 | Rowlette | |
| 4,752,545 A | 6/1988 | Brecht | |
| 4,861,686 A | 8/1989 | Snyder | |
| 4,900,643 A | 2/1990 | Eskra | |
| 5,035,045 A | 7/1991 | Bowen | |
| 5,114,807 A | 5/1992 | Rowlette | |
| 5,288,565 A | 2/1994 | Gruenstern | |
| 5,308,718 A * | 5/1994 | Eidler | H01M 2/024 429/152 |
| 5,393,617 A | 2/1995 | Klein | |
| 5,429,643 A | 7/1995 | Lund et al. | |
| 5,441,824 A * | 8/1995 | Rippel | H01M 10/0413 429/152 |
| 5,470,679 A | 11/1995 | Lund et al. | |
| 5,510,211 A | 4/1996 | Sundberg | |
| 5,582,937 A | 12/1996 | LaFollette | |
| 5,585,209 A | 12/1996 | Feldstein | |
| 5,593,797 A | 1/1997 | Brecht | |
| 5,663,008 A | 9/1997 | Shimakawa et al. | |
| 5,682,671 A | 11/1997 | Lund et al. | |
| 5,688,615 A | 11/1997 | Mrotek | |
| 5,800,946 A | 9/1998 | Grosvenor | |
| 5,916,709 A | 6/1999 | Arias | |
| 6,017,653 A | 1/2000 | Petrakovich | |
| 6,077,623 A | 6/2000 | Grosvenor | |
| 6,139,987 A | 10/2000 | Koo et al. | |
| 6,174,337 B1 | 1/2001 | Keenan | |
| 7,275,130 B2 | 9/2007 | Klein | |
| 8,357,469 B2 | 1/2013 | Shaffer, II et al. | |
| 2004/0072074 A1 | 4/2004 | Partington | |
| 2006/0292443 A1 | 12/2006 | Ogg | |
| 2007/0148542 A1 | 6/2007 | Szymborski | |
| 2009/0042099 A1 | 2/2009 | Tatematsu et al. | |
| 2010/0183920 A1 | 7/2010 | Shaffer et al. | |
| 2011/0091770 A1 | 4/2011 | Han et al. | |
| 2011/0183166 A1 | 7/2011 | Suga et al. | |
| 2014/0087237 A1* | 3/2014 | Dhar | H01M 4/14 429/160 |
| 2014/0349147 A1 | 11/2014 | Shaffer, II et al. | |
| 2015/0140376 A1 | 5/2015 | Shaffer, II et al. | |
| 2016/0197373 A1 | 7/2016 | Shaffer, II et al. | |

FOREIGN PATENT DOCUMENTS

| | | |
|---|---|---|
| DE | 2160868 A1 | 6/1973 |
| DE | 3822462 | 11/1989 |
| DE | 19608326 A1 | 9/1997 |
| DE | 10058381 A1 | 6/2002 |
| DE | 102004018619 A1 | 11/2005 |
| EP | 0402265 A1 | 12/1990 |
| EP | 0631338 | 12/1994 |
| EP | 1329973 A1 | 7/2003 |
| EP | 1418638 A2 | 5/2004 |
| EP | 1986250 A1 | 10/2008 |
| EP | 2017918 A1 | 1/2009 |
| EP | 2405524 A1 | 1/2012 |
| EP | 2645450 A1 | 10/2013 |
| JP | S51-069142 A | 6/1976 |
| JP | S59-121787 A | 7/1984 |
| JP | S59-138076 A | 8/1984 |
| JP | H09-045363 A | 2/1997 |
| JP | 2000-340265 A | 12/2000 |
| JP | 2003-249259 A | 9/2003 |
| JP | 2004-095402 A | 3/2004 |
| JP | 2004-158343 A | 6/2004 |
| JP | 2005-056761 A | 3/2005 |
| JP | 2005-259379 A | 9/2005 |
| JP | 2007-242593 A | 9/2007 |
| JP | 2010-251159 A | 11/2010 |
| JP | 2010-277862 A | 12/2010 |
| JP | 2011-009039 A | 1/2011 |
| JP | 5333576 B2 | 11/2016 |
| KR | 10-0194913 | 6/1999 |
| KR | 10-2001-0097437 | 11/2001 |
| KR | 10-2003-0059930 | 7/2003 |
| KR | 10-2005-0020036 | 6/2005 |
| KR | 10-2010-0033831 A | 3/2010 |
| WO | 93/01624 A1 | 1/1993 |
| WO | 1994/007272 A1 | 3/1994 |
| WO | 01/003224 A1 | 1/2001 |
| WO | 2006/105187 A1 | 10/2006 |
| WO | 2007/132621 A1 | 11/2007 |
| WO | 2010/085474 A1 | 7/2010 |
| WO | 2010/100979 A1 | 9/2010 |

OTHER PUBLICATIONS

Second Office Action from the State Intellectual Property Office of the People's Republic of China for Application No. 201410772503.0, dated Feb. 14, 2017.

Notice of Preliminary Rejection from the Korean Patent Office for Application No. 10-2017-0154421 dated Apr. 1, 2018.

Extended European Search Report from the European Patent Office for Application No. 17020541.3 dated Feb. 27, 2018.

\* cited by examiner

REINFORCED BIPOLAR BATTERY ASSEMBLY

CROSS REFERENCE TO RELATED APPLICATIONS

This application claims priority from U.S. Provisional Application 62/424,809, filed Nov. 21, 2016, and this application is a continuation-in-part of application U.S. Ser. No. 15/070,117, filed Mar. 15, 2016 which is a continuation-in-part of U.S. Ser. No. 14/345,321, filed Mar. 17, 2014 which is a national phase application of Patent Cooperation Treaty application PCT/US2012/033744, filed Apr. 16, 2012 which claims priority from U.S. Provisional Application 61/550,657 filed Oct. 24, 2011.

FIELD

The present disclosure relates generally to a bipolar battery assembly and specifically to a reinforced end plate for a bipolar battery assembly. The present disclosure may find particular use in reinforcing a bipolar battery assembly during vacuum filling and operation of the assembly.

BACKGROUND

Traditionally, bipolar batter assemblies, such as that taught in US Publication No. US 2009/0042099, incorporated herein by reference, include an electrolyte within a stack of electrode plates, located between the separators and electrode plates. The electrolyte allows electrons and ions to flow between the cathode and anode material of the electrode plates. To provide an electrode which does not leak from the electrode stack or into channels of the stack, a solid electrolyte can be used to reduce the need for separate sealing members within the battery assembly.

Although the use of solid electrolyte may be useful in preventing leakage of the electrolyte, it can be advantageous to fill a battery assembly with a liquid electrolyte under a vacuum. Pairs of electrode plates of the battery assembly may form electrochemical cells. By sealing off the battery assembly and filling under a vacuum, an electrolyte may be able to be drawn into the individual electrochemical cells. Under a vacuum, the electrolyte fill rates may be expedited to allow for commercially acceptable fill rates; air pockets or bubbles may be prevented from forming between layers of the battery assembly; and electrochemical cells may be uniformly filled with electrolyte. U.S. Pat. Nos. 4,861,686; 5,470,679; 5,682,671; EP Patent No. 0402265; and PCT Publication No. WO 1994/007272, incorporated herein by reference in their entirety for all purposes, discuss the advantages of filling battery assemblies under a vacuum. US Publication No. 2014/0349147, incorporated by reference in its entirety for all purposes, teaches an elegant solution for filling a battery assembly with a liquid electrolyte while using interlocking components to create a leak proof seal to prevent leaking of the liquid electrolyte. Notwithstanding the above, there is still a need to incorporate a liquid electrolyte into a battery assembly while eliminating the need for complex sealing configurations to prevent the electrolyte from leaking from or within the battery assembly.

To draw a vacuum from a battery assembly, the battery assembly may be placed within a vacuum chamber to activate drawing of an electrolyte into the cells of the battery. Alternatively or in conjunction with a vacuum chamber, separate openings in the battery assembly may be used for drawing the vacuum and filling the assembly with an electrolyte. The drawbacks associated with having separate ports for drawing a vacuum and filling a battery assembly include additional component and manufacturing costs for separate ports and increased time and difficulty to connect and seal multiple ports during assembly in mass production environments. US Publication No. 2014/0349147 teaches how to overcome the need for a separate vacuum chamber and use a single port as a vacuum purge port and an electrolyte fill port. Notwithstanding the above, there is still an ongoing need to quickly fill a battery assembly with electrolyte while ensuring adequate and uniform filling of each electrochemical cell.

Generally, battery assemblies include end plates designed to resist outward bulging during operation of a bipolar battery assembly to properly maintain a seal about and within the battery assembly. The outward bulging is a result of a positive pressure differential between the higher pressures experienced inside of the battery assembly during operation compared to the external pressure (i.e., atmospheric pressure). As taught in US Publication No. 2014/0349147, the use of heavy end plates can be avoided by using an internal structure within the battery assembly which creates an external seal and prevents any liquid or gas from escaping the battery assembly. It may be advantageous to avoid bulky or heavy end plates to provide for a lighter weight battery assembly so that the battery assembly may be integrated into a number of systems which take overall system weight into account. A problem encountered when a single port is used for both creating an internal vacuum within the battery assembly and filling the battery assembly, is internal forces are created when the interior of the battery assembly during creation of the vacuum.

When a single port is used both for creating an internal vacuum within the battery assembly and filling the battery assembly, internal forces are created within the interior of the battery assembly. These internal forces are a result of the negative pressure differential between the extremely low pressure within the interior of the battery assembly due to the vacuum. While a stack of electrode plates having a pair of end plates and/or interlocked electrode plates are sufficiently rigid to withstand outward deformation from positive pressure differentials during operation of a battery assembly, typical electrode plates and end plates may not be able to resist inward deformation from an internal vacuum. Inward deformation may be defined as an inward bending or collapsing of an electrode plate. Generally, as an end plate is attached only about at least a portion of periphery to an adjacent electrode plate, the end plate does not prevent inward deformation of adjacent electrode plate. This inward deformation of the electrode plate may result in reduced interior volume of the battery assembly prior to filling with electrolyte, causing non-uniform and inadequate filling of the electrolyte into the cell. Additionally, as disclosed in US 2014/0349147, stacks of electrode plates may be sealed about their edges and/or along the length of channels formed through the stack through an interference fit. The inward deformation of the electrode plates may result in breaking of the interference fit, thus breaking the seal and causing electrolyte to leak outside of the battery assembly and/or into one or more channels, and the deformed electrode plate may become cracked or otherwise permanently deformed.

What is needed is a battery assembly able to incorporate a liquid electrolyte into a battery assembly under an internal vacuum which maintains a seal about the liquid electrolyte. What is needed is a battery assembly having a single port for both pulling a vacuum inside of the battery assembly and uniformly filling the battery assembly with a liquid electrolyte. What is needed is a lighter weight battery assembly able to resist outward deformation of electrode plates resulting from temperatures and pressures generated during operation and inward deformation of the electrode plates resulting from the creation of an internal vacuum. What is needed is a low weight external support structure.

SUMMARY

The present disclosure relates to an article comprising (a) one or more stacks of a plurality of electrode plates comprising: (i) one or more bipolar plates comprising a substrate having an anode on one surface and a cathode on an opposing surface; (ii) a separator and a liquid electrolyte located between each of the electrode plates; (b) a first end plate having a first end plate internal reinforcement structure, attached at an end of the one or more stacks; (c) a second end plate having a second end plate internal reinforcement structure, attached at an opposing end of the one or more stacks as the first end plate; wherein the first end plate and the second end plate reinforce the plurality of electrode plates during a charge cycle, a discharge cycle, or both the charge cycle and the discharge cycle.

The present disclosure relates to an article comprising: (a) one or more stacks of a plurality of electrode plates comprising: (i) one or more bipolar plates comprising a substrate having an anode on one surface and a cathode on an opposing surface; (ii) a first monopolar plate having a cathode deposited on one surface located at an end of the one or more stacks; (iii) a second monopolar plate having an anode deposited on one surface located at an opposing end of the one or more stacks as the first monopolar plate; (iv) a separator and a liquid electrolyte located between each of the electrode plates; (b) a first end plate having a first end plate internal reinforcement structure, attached about both a periphery and an internal outer surface area of the first monopolar plate; and wherein the first end plate internal reinforcement structure results in the first end plate having a stiffness of about 400 ksi or greater; (c) a second end plate having a second end plate internal reinforcement structure, attached about both a periphery and an internal outer surface area of the second monopolar plate; and wherein the second end plate internal reinforcement structure results in the second end plate having a stiffness of about 400 ksi or greater; wherein the first end plate and the second end plate reinforce the plurality of electrode plates during a charge cycle, a discharge cycle, or both the charge cycle and the discharge cycle; and wherein the first end plate is separate from and affixed to the first monopolar plate and the second end plate is separate from and affixed to the second monopolar plate.

The first end plate internal reinforcement structure may be adhered to the first end plate. The second end plate internal reinforcement structure may be adhered to the second end plate. The internal reinforcement structure may be adhered to the end plates by any method of adhering the structure to the plates which facilitates the structure adequately reinforcing the structure as described herein. The internal reinforcement structure may be adhered by adhesives, molding, melt bonding, vibration welding, laser welding, fasteners, the like, or any combination thereof. The plurality of electrode plates may include a first monopolar plate which may have a cathode deposited on one surface and/or a second monopolar plate which may have an anode deposited on one surface. A first monopolar plate may be located at an end of the one or more stacks. A second monopolar plate may be located at an opposing end of one or more stacks as a first monopolar plate. A first end plate may be attached about a periphery and an inner surface within the periphery of a first monopolar plate. A second end plate may be attached about a periphery and an inner surface within a periphery of a second monopolar plate. A first end plate and a second end plate may reinforce the plurality of electrode plates during an evacuation of about 15 psi (about 103 kPa) prior to filling with a liquid electrolyte. A first end plate may be attached to a first monopolar plate and a second end plate may be attached to a second monopolar plate so that a first monopolar plate and a second monopolar plate are prevented from substantially deforming when the article is vacuum-filled during a charge cycle. A first end plate internal reinforcement structure may be adhered to a first end plate. A second end plate internal reinforcement structure may be adhered into a second end plate. A first end plate, a second end plate, or both may be attached to a first monopolar plate and/or a second monopolar plate with an adhesive material, a tape, a heat stake, a mechanical fastener, or any combination thereof. An internal reinforcement structure may include one or more rib structures. A heat stake, a mechanical fastener, or a combination thereof may be disposed between at least two or more rib structures. A mechanical fastener, a heat stake, or both may attach a first end plate to a first monopolar plate at an inner surface and may not extend into one or more bipolar plates. A mechanical fastener, a heat stake, or both may attach a second end plate to a second monopolar plate at an inner surface and may not extend into one or more bipolar plates.

The article of the disclosure may be able to have an internal vacuum drawn to uniformly distribute a liquid electrolyte while maintaining a seal about the liquid electrolyte. The article of the disclosure may be able to use a single port for both drawing an internal vacuum and filling of a liquid electrolyte. The article of the disclosure may include at least two end plates on opposing ends of an electrode stack which may provide a low-weight solution to resist both outward deformation of the electrode plates during operation and inward deformation of the electrode plates from negative pressure generated during the creation of an internal vacuum. The end plates may resist inward deformation of an electrode plate by being attached about a periphery and/or an interior and having an internal reinforcement structure able to distribute the internal load resulting from the negative pressures of an internal vacuum. The end plates may be able to resist deformation of the electrode plates when drawing an internal vacuum of the battery assembly of about 5 psi (about 34.5 kPa) to about 30 psi (about 207 kPa).

DETAILED DESCRIPTION

Figure 1:
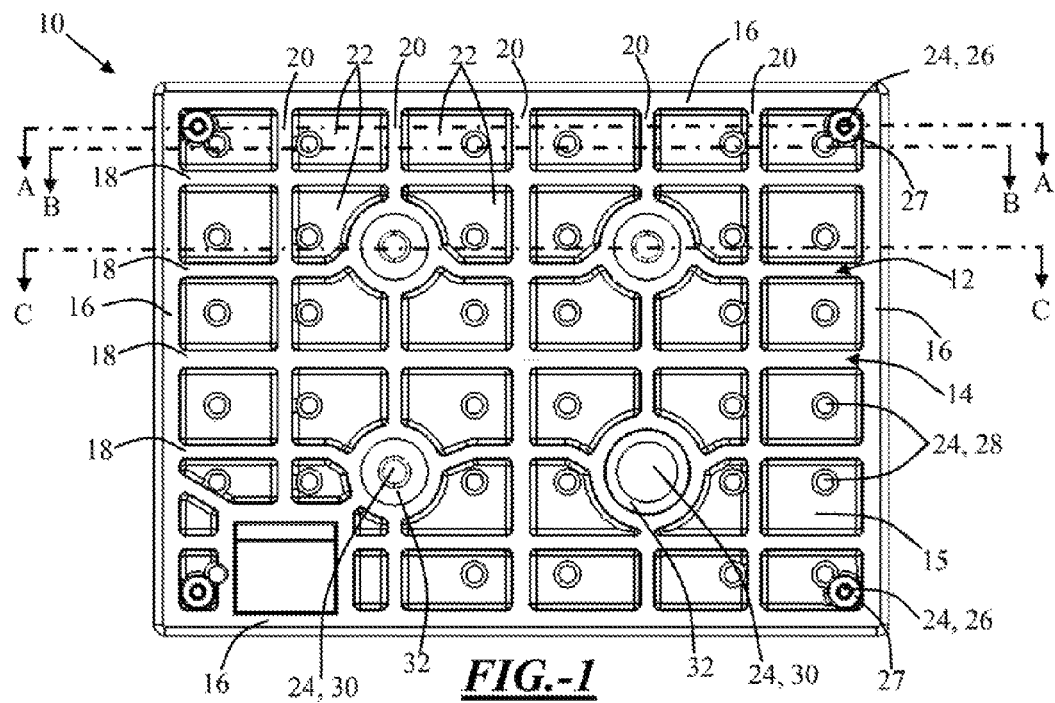
FIG. 1 is a front view of an end plate having an internal reinforcement structure.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The article of the disclosure generally relates to a battery assembly and may find particular use as a bipolar battery assembly. The battery assembly includes one or more stacks of a plurality of electrode plates. The plurality of electrode plates includes one or more bipolar plates. The one or more bipolar plates include a substrate having an anode one surface and a cathode on an opposing surface. The plurality of electrode plates may include one or more monopolar plates which may be located at opposing ends of the one or more stacks. A monopolar plate may include either an anode or a cathode deposited on a surface. The stack includes a separator and an electrolyte located between each of the electrode plates. The battery assembly includes one or more end plates, such as a first end plate and a second plate. The one or more end plates are attached at one or more ends of the stack. For example, a first end plate may be attached at an opposing end of the stack as a second end plate. The one or more end plates may be particularly useful for reinforcing one or more electrode plates during drawing of a vacuum within the battery assembly, filling of the battery assembly, during operation in a charge and/or discharge cycle of the battery assembly, or any combination thereof.

The article of the disclosure may further comprise one or more of the features listed below in any combination: the first end plate internal reinforcement structure may result in the first end plate having a stiffness of about 400 ksi or greater; the second end plate internal reinforcement structure may result in the second end plate having a stiffness of about 400 ksi or greater; the first end plate and the second end plate may reinforce the plurality of electrode plates during an evacuation of about 5 psi to about 30 psi prior to filling with the liquid electrolyte; the first end plate and the second end plate may reinforcement the plurality of electrode plates during evacuation prior to filling with the liquid electrolyte to prevent inward deformation of the plurality of electrode plates; the first end plate internal reinforcement structure may be molded into the first end plate; the second end plate internal reinforcement structure may be molded into the second end plate; a first monopolar plate may have a cathode deposited on one surface; the first monopolar plate may be located at the end of the one or more stacks; a second monopolar plate may have an anode deposited on one surface; the second monopolar plate may be located at the opposing end of the one or more stacks as the first monopolar plate; the first end plate may be attached about a periphery and an inner surface within the periphery of the first monopolar plate; the second end plate may be attached about a periphery and an inner surface within the periphery of the second monopolar plate; the first end plate, the second end plate, or both the first end plate and the second end plate may be attached to the first monopolar plate and the second monopolar plate with an adhesive material, a tape, a heat stake, a mechanical fastener, or a combination thereof; the adhesive material may be an epoxy, an acrylic, a urethane, or a combination thereof; the heat stake, the mechanical fastener, or a combination thereof may be disposed between at least two or more ribs; the first monopolar plate, the second monopolar plate, or both the first monopolar plate and the second monopolar plate may include one or more nuts which may receive one or more of the mechanical fastener; the mechanical fastener, the heat stake, or a combination thereof may attach the first end plate to the first monopolar plate at the inner surface and may not extend into any of the one or more bipolar plates; the mechanical fastener, the heat stake, or a combination thereof may attach the second end plate to the second monopolar plate at the inner surface and may not extend into any of the one or more bipolar plates; the first end plate may be attached to the first monopolar plate and the second end plate may be attached to the second monopolar plate so that the first monopolar plate and the second monopolar plate may be prevented from substantially deforming when the article is vacuum-filled during the charge cycle; the first end plate may be a first monopolar plate having a cathode deposited on one surface; the second end plate may be a second monopolar plate having an anode deposited on one surface; the first end plate internal reinforcement structure, the second end plate internal reinforcement structure, or both may include two or more ribs; the separator, the liquid electrolyte, and the opposing surfaces of the plates may be an electrochemical cell; article may comprise an integrated channel communicating with one or more vent holes in communication with the electrochemical cell; the integrated channel may comprise openings in the separator and electrode plates that are aligned to form the integrated channel; one or more openings may pass through one or more end plates, the plurality of electrode plates, and separators; the one or more openings may align with each other in a transverse direction; the one or more openings may include inserts disposed or integrated therein; the inserts may be adapted for form an integrated channel; the inserts may have vent holes which communicate with electrochemical cells; an integrated channel may be terminated with one or more valves; an integrated channel may communicate with the outside of the stack in two places; the integrated channel may be adapted for filling the electrochemical cells with electrolyte and/or for venting the electrochemical cells; the stack of electrode plates may have a plurality of channels passing transversely through a portion of the electrode plates having the cathode and/or anode deposited thereon; posts may be located in one or more of the channels; posts may comprise a polymeric material; a plurality of channels may be formed by a series of matched inserts in one or more end plates, battery plates, and separators; inserts may be located about a periphery of each channel to prevent leakage of a liquid electrolyte into the channel; a plurality of posts may be located in one or more of the channels; the posts may have on each end an overlapping portion which covers a channel and a sealing surface on the outside of the end plates adjacent to the openings of the channels and may apply pressure on a sealing surface of the end plates; a plurality of channels may be spaced to spread out compressive forces generated during operation of the article; there may be fewer posts than channels; channels without posts may be used as cooling channels, filling channels, and/or venting channels.

The article of the disclosure includes one or more end plates. The one or more end plates may function to reinforce one or more electrode plates, resist or prevent both outward and inward deformation of one or more electrode plates due to pressure differentials within a battery assembly compared to the external environment, prevent semi-permanent or permanent damage to one or more electrode plates, ensure interlocked components which create a seal remain sealed, or any combination thereof. The one or more end plates may have any size, shape, and/or configuration to reinforce one or more electrode plates, resist or prevent both outward and inward deformation of one or more electrode plates due to pressure differentials within a battery assembly compared to the external environment, prevent semi-permanent or permanent damage to one or more electrode plates, ensure interlocked components which create a seal remain sealed, or any combination thereof. The one or more end plates may or may not be an electrode plate. For example, one or more end plates may be one or more monopolar plates. Alternatively, the one or more end plates may be adjacent to one or more electrode plates, such as a monopolar plate. The one or more end plates may be attached to one or more electrode plates at opposing ends of a stack. For example, a stack may include a first end plate at an opposing end of the stack as a second end plate. The one or more end plates may be sufficiently rigid to resist outward bulging created by temperatures and pressures within a battery assembly during operation, resist inward bending during pulling of a vacuum inside of the battery assembly, or both. The end plate may include a base, an internal reinforcement structure, one or more openings, one or more raised inserts, one or more attachment mechanisms, or any combination thereof.

The one or more end plates may include a base. The base may function to affix the end plate to one or more electrode plates, provide reinforcement to one or more electrode plates, distribute a deformation load across one or more electrode plates, serve as a carrier for an internal reinforcement structure, or any combination thereof. The base may have any size, shape, and/or configuration to perform any combination of the desired functions. The base may take on the general cross-sectional shape of the end of the battery assembly where it may be located. The base may be generally shaped like a cube, rectangular prism, cylinder, cone, pyramid, sphere, the like, or any combination thereof. For example, the base may have a generally cube and/or rectangular prism shape. The base may have a shape and/or cross-section substantially similar to one or more electrode plates. The base may include generally planar and/or non-planar surfaces. The base may have a generally uniform or non-uniform thickness. The base may be adjacent to an electrode plate, such as a monopolar plate. The base may be distanced from and/or in contact with an adjacent electrode plate. The base may be part of an electrode plate, such as a substrate. A substantially planar surface of the base, opposite an internal reinforcement structure, or the internal reinforcement structure may face a surface of an electrode plate, such as a surface free of a cathode or anode material. The base may have a thickness sufficient to cooperate with an internal reinforcement structure to distribute a deformation load across one or more electrode plates to prevent outward bulging and inward bending of an adjacent electrode plate. The thickness of the base may be the distance between two opposing surfaces of the base substantially perpendicular to a longitudinal axis of the battery assembly. A longitudinal axis may orthogonally intersect one or more cathode and/or anode bearing surfaces of a plurality of electrode plates. An internal reinforcement structure, attachment of the base to an adjacent electrode plate about both a periphery and an interior, and a seal structure of the plurality of electrode plates may allow the base to have a smaller thickness compared to bulkier end plates. The end plate with a reinforcement structure may have thickness about 80% or less, about 70% or less, or even 60% or less than a traditional end plate without an internal reinforcement structure. The end plate with a reinforcement structure may have thickness about 25% or greater, about 35% or greater, or even 45% or greater than a traditional end plate without an internal reinforcement structure. The seal structure of the plurality of electrode plates may include one or more inserts, bosses, frames, raised edges, or any other seal as described herein. The base may have a thickness of about 1 mm or more, about 3 mm or more, or even about 5 mm or more. The base may have a thickness of about 15 mm or less, about 10 mm or less, or even about 8 mm or less. The base may include an internal reinforcement structure, one or more openings, one or more inserts, one or more attachment mechanisms, one or more sealing surfaces, one or more recessed portions, or any combination thereof.

One or more end plates may include an internal reinforcement structure. The internal reinforcement structure may function to provide additional strength, distribute deformation loads, increase durability, reduce thickness, reduce weight, or any combination thereof of an end plate, an electrode plate, or any combination thereof. The internal reinforcement structure may have any size, shape, and/or configuration to provide any combination of the desired features. The internal reinforcement structure may result in one or more end plates having a stiffness of about 200 ksi or greater, about 400 ksi or greater, or even about 500 ksi or greater. The internal reinforcement may result in one or more end plates having a stiffness of about 1500 ksi or less, about 1200 ksi or less, or even about 1000 ksi or less. The internal reinforcement structure may distribute deformation loads received by the base from one or more electrode plates. Deformation loads may be understood as the forces experienced by the one or more electrode plates, such as when a vacuum is pulled in the battery assembly and/or by pressures generated within the battery assembly during operation. The internal reinforcement structure may distribute deformation loads substantially uniform across the base. By distributing the deformation load, the internal reinforcement structure may resist outward bulging or inward bending of the end plate which may result in resisting outward bulging or inward bending of an electrode plate adjacent to the end plate due to being attached. As one or more electrode plates adjacent to one or more end plates, such as opposing monopolar plates, resist deformation, one or more electrode plates located therebetween are prevented from deforming. The internal reinforcement structure may be distributed across a surface of the base, be localized in regions of a surface of the base, or both. The internal reinforcement structure may include one or more internal reinforcement structures, such as a plurality of internal reinforcement structures. Exemplary internal reinforcement structures may include one or more rib structures, one or more cells, one or more inserts, one or more openings, one or more attachment mechanisms, the like, or any combination thereof. The internal reinforcement structure may include one or more strengthening materials to provide reinforcement to an end plate. Exemplary strengthening materials may include additives, such as fibers, composite materials, the like, or both.

An internal reinforcement structure may include one or more rib structures. The one or more rib structures may function to distribute one or more deformation loads throughout an end plate, providing light weight reinforcement to a base of an end plate, provide reinforcement to one or more inserts, openings, and/or channels, or any combination thereof. The one or more rib structures may have any size, shape, and/or configuration to provide one or more of the preceding functions. The one or more rib structures may be integral with or attached to a base of an end plate. The one or more rib structures may be integrally formed through compressive forming, tensile forming, molding, or the like, or any combination thereof. Compressive forming may include die forming, extrusion, indenting, the like, or any combination thereof. Molding may include injection molding. The one or more rib structures may be attached to a base of an end plate by an adhesive, melt bonding, or the like. The one or more rib structures may include one or more ribs, one or more gussets, one or more projections, one or more posts, the like, or any combination thereof which are able to distribute or absorb at least part of a deformation load. The one or more rib structures may be planar, non-planar or a combination of both. The one or more rib structures may be located on any surface of a base of an end plate. The one or more rib structures may be located on a surface of a base substantially perpendicular to a longitudinal axis of a battery assembly. The one or more rib structures may project from a surface of the base. One or more rib structures may project at a perpendicular and/or orthogonal angle. The one or more rib structures may be located about a periphery of the base, an interior of the base, or both. For example, an outer reinforcement rib may project from a surface of the base and be located about at least a portion of a peripheral edge of the base. An outer reinforcement rib may define a periphery and/or an interior of an end plate or base. A periphery of the end plate or base may be the outer edge of the end plate including the outer reinforcement rib. An interior of the end plate or base may be defined as the portion of the end plate or base located within a periphery. The one or more rib structures may form a repetitive pattern, may be staggered, may be off-set, or any combination thereof on a surface of the base. For example, a plurality of rib structures may form an intersecting pattern, such as a lattice, grid, and/or honeycomb structure across a surface of the base. One or more rib structures may form a pattern within an interior of the base. One or more rib structures may be substantially parallel to one or more other rib structures, a portion of an outer reinforcement structure, or both. One or more rib structures may intersect and/or merge with one or more other rib structures, inserts, and/or openings substantially perpendicularly and/or obliquely. The one or more rib structures may include one or more latitudinal rib structures, longitudinal rib structures, or both. Latitudinal and longitudinal rib structures may be defined as rib structures which intersect substantially perpendicular to one another.

The one or more rib structures may have a height, a width, and a thickness. A height of a rib structure may be a distance from an end of a rib structure adjacent to the base to an opposing end of the rib structure. One or more rib structures may have a same or differing height as one or more other rib structures. One or more rib structures may have a substantially uniform height or a non-uniform height along its length. One or more rib structures may have a height of about 1 mm or more, about 3 mm or more, or even about 5 mm or more. One or more rib structures may have a height of about 15 mm or less, about 12 or less, or even about 10 mm or less. A length of a rib structure may be from one end of a rib structure attached to another rib structure to an opposing end of the rib structure. One or more rib structures may have a substantially same or differing length as one or more other rib structures. One or more rib structures may have a length about less than, equal to, or greater than a length or width of a base of the end plate. One or more rib structures may have a length about equal to a length or width of a base at a peripheral edge. One or more rib structures may have a length about equal to an interior length or width of a base. One or more rib structures may have a length which extends from one rib structure, insert, or opening to another rib structure, insert, an opening. One or more rib structures may have a length of about 1 mm, mm or more, about 10 mm or more, or even about 25 mm or more. One or more rib structures may have a length of about 300 mm or less, about 250 mm or less, or even about 150 mm or less. A thickness of a rib structure may be the distance between two planar surfaces of the rib structure, two surfaces of the rib structure facing other rib structures, two surfaces of a rib structure facing adjacent cells, or any combination thereof. One or more rib structures may have a same or differing thickness as one or more other rib structures. One or more rib structures may have a thickness which is substantially uniform along its length or non-uniform. One or more rib structures may have a thickness of about 0.5 mm or more, about 1 mm or more, or even about 3 mm or more. One or more rib structures may have a thickness of about 15 mm or less, about 12 or less, or even about 10 mm or less. The one or more rib structures may cover a density of a surface of the base, such that a certain percentage of the surface includes one or more rib structures. About 5% or greater, about 10% or greater, or even about 20% or greater of an area of a surface of the base may include one or more rib structures. About 80% or less, about 70% or less, or even about 50% or less of an area of a surface of the base may include one or more rib structures.

The one or more rib structures may form one or more cells. The one or more cells may function to provide a reinforced end plate without a bulky reinforcement structure. One or more cells may be defined where a plurality of rib structures adjoin or are integral with one another to define a continuous wall. For example, two longitudinal rib structures and two latitudinal rib structures may intersect and or adjoin one another to form a cell with a continuous wall. For example, an outer reinforcement rib structure and a plurality of latitudinal or longitudinal rib structures may intersect and or adjoin one another for form a cell with a continuous wall. One or more cells may expose a surface of the base, such as a surface from which one or more rib structures project. One or more cells may be located within an interior of the end plate. One or more cells may have a cross-sectional area. The cross-sectional area may be defined as the area formed between a plurality of rib structures. The cross-sectional area may be defined as the area formed within a continuous wall. A cross-sectional area may be a cross-section of a cell substantially parallel to a surface of the base from which one or more rib structures project. One or more cells may have a cross-sectional area smaller than, equal to, or larger than one or more other cells. The cross-sectional area may be about 10 $mm^2$ or more, about 50 $mm^2$ or more, or even about 150 $mm^2$ or more. The cross-sectional area may be about 1000 $mm^2$ or less, about 750 $mm^2$ or less, or even about 650 $mm^2$ or less. One or more cells may include one or more openings one or more attachment mechanisms, or both.

One or more end plates may include one or more openings. The one or more openings may function to provide an opening for an attachment mechanism to pass therethrough; cooperate with one or more electrode plates and/or inserts to form part of a channel; allow for a vacuum pulling, filling, and/or venting of the battery assembly; or any combination thereof. The one or more openings may have any size, shape, and/or configuration to provide any combination of the desired functions. The one or more openings may have any combination of the features as described for openings and/or holes in one or more electrode plates and/or substrates. One or more openings of one or more end plates may align (i.e., be concentric) with one or more openings of one or more electrode plates and/or separators so as to form one or more channels. One or more openings may have a shape or size similar to one or more openings of an electrode plate adjacent to the end plate. The one or more openings may have a cross-sectional shape which functions to receive an attachment mechanism, receive a post, cooperate with an insert, or any combination of the desired functions of the openings and may be generally rectangular, circular, triangular, elliptical, ovular, or any combination thereof. The one or more openings may have a cross-sectional width sufficient to receive one or more attachment mechanisms, one or more posts, one or more valves, or any combination thereof. One or more openings may have a cross-sectional width less than, equal to, or greater than a diameter of one or more openings formed within the same end plate and/or an adjacent electrode plate. A cross-sectional width of one or more openings may be continuous, taper, or expand along a length of an opening. The one or more openings may have a cross-sectional width of about 1 mm or more, about 3 mm or more, or even about 5 mm or more. The one or more openings may have a cross-sectional width of about 30 mm or less, about 25 mm or less, or even about 20 mm or less. The one or more openings may pass partially or completely through an insert, a base, a reinforcement structure, a rib structure, or any combination thereof. The one or more openings may be located about or adjacent a periphery, within an interior, or both of an end plate. The one or more openings may be located adjacent one or more rib structures, between two or more rib structures, within a cell, adjacent one or more inserts, or any combination thereof. The one or more openings may form a repetitive pattern, may be aligned with one or more other openings, may be staggered or offset from one or more other openings, or any combination thereof. The one or more openings may include one or more peripheral openings, one or more internal openings, one or more channel openings, the like, or any combination thereof.

One or more openings may include one or more peripheral openings. The one or more peripheral openings may function to receive and cooperate with one or more attachment mechanisms to secure at least a portion of a periphery of an end plate to at least a portion of a periphery of an electrode plate. Attachment about at least a portion of a periphery of the end plate to an adjacent electrode plate may apply a compressive force about a periphery of one or more electrode plates. The compressive force about the periphery during operation of the battery may resist outward bulging of one or more electrode plates. The compressive force about the periphery while drawing a vacuum within the battery may resist inward bending of one or more electrode plates, which may maintain one or more seals about one or more edges of the stack of electrode plates. The one or more peripheral openings may be located adjacent an outer reinforcement rib structure, within an interior of an end plate, within a cell, or any combination thereof. The one or more peripheral openings may be aligned or offset from one or more other openings. For example, one or more peripheral openings may be aligned with one or more other peripheral openings in a line substantially parallel to one or more rib structures. For example, one or more peripheral openings may be offset from an aligned plurality of internal openings and/or channel openings. One or more peripheral openings may have any cross-sectional width or diameter through which an attachment mechanism is able to pass through, to or from an adjacent electrode plate. One or more peripheral openings may be smaller than, equal to, or larger than one or more other openings. For example, one or more peripheral openings may be smaller than one or more channel openings.

One or more openings may include one or more internal openings. The one or more internal openings may function to receive and cooperate with one or more attachment mechanisms to secure at least a portion of an interior of an end plate to at least a portion of an interior of an electrode plate. An interior of an electrode plate may be defined as a portion of the electrode plate or substrate of an electrode plate located between raised edges or a frame of the electrode plate. Attachment about at least a portion of an interior of an end plate to an adjacent electrode plate may apply a compressive force about an interior of one or more electrode plates. The compressive force within the interior of an electrode plate during operation of the battery may resist outward bulging of one or more electrode plates. The compressive force within the interior of an electrode plate while drawing a vacuum within the battery may resist inward bulging of one or more electrode plates. The one or more internal openings may be located adjacent or distanced from one or more reinforcement rib structures, within an interior of an end plate, within a cell, or any combination thereof. The one or more internal openings may be aligned or offset from one or more other openings. For example, one or more internal openings may be aligned with one or more other internal openings in a line substantially parallel to one or more rib structures. For example, one or more internal openings may be offset from an aligned plurality of internal openings and/or channel openings. One or more internal openings may have any cross-sectional width or diameter through which an attachment mechanism is able to pass through, to or from an adjacent electrode plate. One or more internal openings may be smaller than, equal to, or larger than one or more other openings. For example, one or more internal openings may be smaller than one or more channel openings.

One or more openings may include one or more channel openings. The one or more channel openings may function to align with one or more openings of one or more electrode plates to form one or more channels; provide an opening for venting, filling, and/or venting the battery assembly; cooperate with one or more valves, receive one or more posts to compress the stack of electrode plates, or any combination thereof. The one or more channel openings may align (i.e., concentric alignment) with one or more openings and/or holes of one or more electrode plates and/or separators in a transverse direction to form one or more channels through the stack. The one or more channel openings may have a size substantially equal to one or more holes of one or more electrode plates and/or separators. The one or more channel openings may have any size through which one or more posts may pass through. One or more channel openings may have a smaller, equal, or larger cross-sectional width or area than one or more other channel openings. For example, one channel opening may have a larger diameter than one or more other channel openings to allow for filling, venting, and/or cooling of the battery. One or more channel openings may be connected to or in communicated with one or more valves. For example, a channel opening having a larger diameter than other channel openings may be connected to a valve. A surface of the base near and/or adjacent to one or more channel openings may be a sealing surface.

One or more end plates may include a sealing surface. The sealing surface may function to cooperate with one or more posts to compress and seal a stack of electrode plates. The sealing surface may be a surface of the end plates adjacent to one or more openings of an end plate, a surface of an end plate adjacent to a channel, a surface of the end plate between an insert and an opening, a surface of an insert, or any combination thereof. A sealing surface may be a surface of an end plate in direct contact with a portion of a post, such as an overlapping portion. A sealing surface may be opposing a surface of the end plate facing and/or in contact with a monopolar plate. The sealing surface of the plate may be modified to improve sealing when compression is applied by the posts. The sealing surface may be smoothed, contoured, roughened or surface treated. A smooth surface will have large contact area from which to make an electrolyte tight seal without defects that allow liquid flow. Contours such as concentric ring(s), ridge(s) or undulations cause areas or "rings" of high pressure contact to resist the flow of liquid electrolyte. The ridge may be filled with a gasket material such as a deformable flat sheet or O-ring to facilitate liquid sealing. Rough sealing surfaces of a deformable material can compress to form reliable liquid electrolyte seal. Surface treating the sealing surface to make it incompatible to wetting by the liquid electrolyte will prevent liquid electrolyte flow into the channel. If a hydrophilic electrolyte is used the sealing surface can be made hydrophobic. Likewise, if a hydrophobic electrolyte is used the sealing surface should be hydrophilic.

One or more end plates may include one or more inserts. The one or more inserts may function to interlock with one or more inserts of an electrode plate, to define a portion of one or more channels passing through the stack, forming a leak proof seal along one or more channels, cooperate with one or more valves, or any combination thereof. The one or more inserts may have any size and/or shape to interlock with one or more inserts of an electrode plate, form a portion of a channel, form a leak proof seal along one or more channels, cooperate with one or more valves, or any combination thereof. The one or more inserts may be formed or attached to a base of an end plate in any manner suitable for forming or attaching one or more rib structures. One or more inserts may project from a surface of an end plate forming a one or more raised inserts. One or more inserts may project from a base of an end plate. One or more inserts may project is a same or opposing direction as one or more rib structures from the base. One or more inserts may have the same height and/or thickness as one or more rib structures. One or more inserts may project substantially orthogonally or oblique from a surface of the base. One or more inserts may be attached to or integral with a portion of the end plate. An insert which is integral with a portion of the end plate and projects from a surface of the end plate may be defined as a boss. The one or more inserts may have one or more openings therethrough. The one or more inserts may be concentric and formed about one or more openings. One or more inserts may extend a length of an opening. A sealing surface may be formed between the outer diameter of one or more openings and an interior of one or more inserts. For example, a surface of the base substantially perpendicular to a longitudinal axis of the battery located between an insert and an opening may be a sealing surface. One or more inserts may be capable of interlocking with one or more inserts of an adjacent electrode plate to form a leak proof seal about a channel. For example, one or more end plates may be machined or formed to contain matching indents, on a surface opposite from an insert, for bosses, inserts, sleeves, or bushings of an adjacent electrode plate.

One or more end plates may be comprised of one or more end plate materials. End plate materials may function to provide sufficient rigidity to the one or more end plates to resist deformation and provide reinforcement to one or more electrode plates while pulling a vacuum, filling, and/or operating the battery assembly. The one or more end plate materials may include any material or combination of materials capable of meeting any combination of the desired functions. The one or more end plate materials may have a stiffness of about 200 ksi (1,379 MPa) or greater, about 400 ksi (2,758 MPa) or greater, or even about 500 ksi (3,447 MPa) or greater. The one or more end plate materials may have a stiffness of about 1,500 ksi (10,342 MPa) or less, about 1,200 ksi (8,274 MPa) or less, or even about 1,000 ksi (6,895 MPa) or less. The one or more end plate materials may have a Compressive Strength of about 20 MPa or greater, about 40 MPa or greater, or even about 60 MPa or greater. The one or more end plate materials may have a Compressive Strength of about 1,300 MPa or less, about 1,200 MPa or less, or even about 1,000 MPa or less. The one or more end plate materials may have a Tensile Strength of about 300 MPa or greater, about 400 MPa or greater, or even about 500 MPa or greater. The one or more end plate materials may have a Tensile Strength of about 2,000 MPa or less, about 1,900 MPa or less, or even about 1,800 MPa or less. The one or more end plate materials may be part of a base, a reinforcement structure, one or more rib structures, one or more inserts, or any combination thereof. The one or more end plate materials may include any material suitable for an electrode plate, such as materials of a substrate. The one or more end plate materials may include a metal, a polymeric material, or both. Metal may include cast iron, steel, stainless steel, titanium, aluminum, carbon steel, the like, or any combination thereof. Polymeric material may be any material which may be molded. For example, the polymeric material may be injection molded. Polymeric material may include a thermoset polymer, a thermoplastic polymer, or a combination thereof. The polymeric material may be reinforced with any known reinforcement material known for use with polymers. Reinforcement material may include fibers, microspheres, beads, bubbles, the like or any combination thereof. Reinforcement material may include glass, polymers, ceramic or carbon, the like, or any combination thereof.

One or more end plates may include one or more attachment mechanisms. One or more attachment mechanisms may function to attach one or more end plates to one or more electrode plates, a stack of electrode plates, or both. The end plate being attached to one or more electrode plates or one or more end plates may prevent deformation of one or more electrode plates during vacuum drawing, filling, venting, cooling, charging, and/or discharging of one or more electrochemical cells before, during, and/or after operation of the battery. One or more end plates may be attached to one or more electrode plates, a stack of electrode plates, or both through any type of attachment mechanism able to withstand deformation forces before, after, or during operation of the battery. One or more attachment mechanisms may attach one or more end plates about at least a portion of a periphery of an end plate to an electrode plate, at least a portion of an interior of end plate to an electrode plate, or both. One or more attachment mechanisms may be any attachment mechanism capable of interlocking plastic to metal, plastic to plastic, metal to metal, or any combination thereof. The one or more attachment mechanisms may be integral with or separate from an end plate and/or an electrode plate. The one or more attachment mechanisms may attach to an exterior surface of an electrode plate, pass at least partially through one or more electrode plates, project from the end plate toward and/or into an electrode plate, project from an electrode plate toward and/or into an end plate, or any combination thereof. The one or more attachment mechanisms may be received in an opening of an end plate, an electrode plate, or both. One or more attachment mechanisms may include one or more adhesive materials, mechanical fasteners, molded fasteners, the like, or any combination thereof. A mechanical fastener may include a threaded fastener, a clip, a staple, the like, or any combination thereof. A threaded fastener may include a screw, a bolt, a stud, a nut, the like, or any combination thereof. An adhesive material may include an adhesive, a sealant, a tape, the like, or any combination thereof. Adhesive may include an epoxy, an acrylic, a urethane, the like, or any combination thereof. A tape may include very high bond tape, double sided tape, the like, or any combination thereof. A molded fastener may include a heat stake, a weld, the like, or any combination thereof. A clip may include a snap-fit, a press-fit, cantilever clip, clip with a hook face.

The base may have one or more recessed portions. The one or more recessed portions may function to receive one or more portions of one or more electrode plates, interlock with a periphery of one or more electrode plates, or both. The one or more recessed portions may have any size, shape, and/or configuration to receive one or more portions of one or more electrode plates, interlock with a periphery of one or more electrode plates, or both. The one or more recessed portions may have a shape substantially similar, reciprocal, and or negative to a portion of one or more electrode plates, such as a frame and/or raised edge. The one or more recessed portions may be located about an exterior and/or interior of the base. The one or more recessed portions may be located about a periphery of the base. The one or more recessed portions may be formed in a surface which comes into contact with one or more electrode plates. For example, one or more recessed portions may be formed about a peripheral edge of the base opposite a surface having an interior reinforcement structure. The one or more recessed portions may align and interlock with one or more raised edges or frames. The one or more recessed portions may be designed similarly to a frame or raised edge of an electrode plate or separator.

The article may include a plurality of electrode plates. The plurality of electrode plates may function to conduct an electric current (i.e., flow of ions and electrons) within the battery assembly. The plurality of electrode plates may form one or more electrochemical cells. For example, a pair of electrode plates, which may have a separator therebetween, may form an electrochemical cell. The plurality of electrode plates can have any desired cross sectional shape and the cross sectional shape can be designed to fit the packaging space available in the use environment. Cross-sectional shape refers to the shape of the plates from the perspective of the faces of the sheets. Flexible cross-sectional shapes and sizes allow preparation of the articles disclosed to accommodate the voltage and size needs of the system in which the batteries are utilized. Opposing end plates may sandwich a plurality of electrode plates therebetween. The plurality of electrode plates may include one or more monopolar plates, one or more bipolar plates, or any combination thereof.

The plurality of electrode plates includes one or more bipolar plates. The one or more bipolar plates may include a plurality of bipolar plates. Plurality as used herein means that there are more than one of the plates. A bipolar plate comprises a substrate in the form of a sheet having two opposing faces. Located on the opposing faces are a cathode and an anode. In some embodiments, the bipolar plates are arranged in the article in stacks so that the cathode of one bipolar plate faces the anode of another bipolar plate or a monopolar plate and the anode of each bipolar plate faces the cathode of a bipolar or monopolar plate. In the article, a space may be formed between adjacent anodes and cathodes of adjacent electrode plates. The space between the electrode plates may include a separator and/or an electrolyte. The number of electrode plates present can be chosen to provide the desired voltage of the battery. The bipolar battery design provides flexibility in the voltage that can be produced.

The plurality of electrode plates includes one or more monopolar plates. The one or more monopolar plates may include a plurality of monopolar plates. The one or more monopolar plates may include a monopolar plate located at each opposing end of a plurality of electrode plates. Opposing monopolar plates may include one or more bipolar plates located therebetween. One or more monopolar plates may be located adjacent to, may be part of, or may be, one or more end plates. For example, each of the monopolar plates may be located between an adjacent end plate and an adjacent bipolar plate. One or more monopolar plates may be attached to one or more end plates. One or more monopolar end plates may be attached about a periphery, interior, or both to one or more end plates. One or more monopolar plates may be prepared from the same substrates and anodes and cathodes used in one or more bipolar plates. A surface or side of a monopolar plate opposing the anode or cathode and/or facing an end plate may be a bare surface of a substrate.

One or more electrode plates may include one or more substrates. One or more substrates function to provide structural support for the cathode and/or the anode; as a cell partition so as to prevent the flow of electrolyte between adjacent electrochemical cells; cooperating with other battery components to form an electrolyte-tight seal about the bipolar plate edges which may be on the outside surface of the battery; and in some embodiments to transmit electrons from one surface to the other. The substrate can be formed from a variety of materials depending on the function or the battery chemistry. The substrate may be formed from materials that are sufficiently structurally robust to provide the backbone of a desired bipolar electrode plate, withstanding temperatures that exceed the melting points of any conductive materials used in the battery construction, and having high chemical stability during contact with an electrolyte (e.g., sulfuric acid solution) so that the substrate does not degrade upon contact with an electrolyte. The substrate may be formed from suitable materials and/or is configured in a manner that permits the transmission of electricity from one surface of the substrate to an opposite substrate surface. The substrate plate may be formed from an electrically conductive material, e.g., a metallic material, or can be formed from an electrically non-conductive material. Exemplary non-conductive material include polymers; such as thermoset polymers, elastomeric polymers or thermoplastic polymers or any combination thereof. The non-conductive substrate may have electrically conductive features constructed therein or thereon. Examples of polymeric materials that may be employed include polyamide, polyester, polystyrene, polyethylene (including polyethylene terephthalate, high density polyethylene and low density polyethylene), polycarbonates (PC), polypropylene, polyvinyl chloride, bio-based plastics/biopolymers (e.g., polylactic acid), silicone, acrylonitrile butadiene styrene (ABS), or any combination thereof, such as PC/ABS (blends of polycarbonates and acrylonitrile butadiene styrenes). Composite substrates may be utilized, the composite may contain reinforcing materials, such as fibers or fillers commonly known in the art, two different polymeric materials such as a thermoset core and a thermoplastic shell or thermoplastic edge about the periphery of the thermoset polymer, or conductive material disposed in a non-conductive polymer. The substrate may comprise or have at the edge of the plates a thermoplastic material that is bondable, preferably melt bondable.

One or more substrates may have a raised edge about the periphery so as to facilitate stacking of the electrode plates and formation of electrochemical cells. The raised edge as used in this context means a raised edge on at least one of the two opposing surfaces of the plates. The raised edge may comprise a thermoplastic edge portion formed about another substrate material. The raised edge may function as separator plates as described herein. The substrate or periphery of the substrate may be a non-conductive material, and may be a thermoplastic material. One or more substrates may include a frame. The frame may or may not include the raised edge. The frame about or integrated onto the substrate may be comprised of non-conductive material, such as a thermoplastic material. The use of non-conductive material enhances sealing the outside of the battery stack.

The one or more electrode plates may include one or more attachment mechanisms as described hereinbefore.

One or more of the electrode plates may include a cathode. The cathode can be in any material that is capable of functioning as a cathode in a battery and can be in any form commonly used in batteries. A bipolar plate may include a cathode on a surface opposing a surface having an anode deposited thereon and opposing an anode of either another bipolar plate or monopolar plate. A monopolar plate may have an cathode deposited on a surface opposing a surface bare of either a cathode or anode, opposing a surface adjacent to an end plate, or both. The cathode is also referred to as positive active material. The positive active material may comprise a composite oxide, a sulfate compound or a phosphate compound of lithium, lead, carbon or a transition metal generally used in a lithium ion, nickel metal hydride or lead acid secondary battery. Examples of the composite oxides include Li/Co based composite oxide such as $LiCoO_2$, Li/Ni based composite oxide such as $LiNiO_2$, Li/Mn based composite oxide such as spinel $LiMn_2O_4$, and Li/Fe based composite materials such as $LiFeO_2$. Exemplary phosphate and sulfur compounds of transition metal and lithium include $LiFePO_4$, $V_2O_5$, $MnO_2$, $TiS_2$, $MoS_2$, $MoO_3$, $PbO_2$, $AgO$, $NiOOH$ and the like. The cathode material can be in any form which allows the cathode material to function as a cathode in an electrochemical cell. Exemplary forms include formed parts, in paste form, prefabricated sheet or film. For lead acid, batteries the preferred cathode material is lead dioxide ($PbO_2$).

One or more of the electrode plates may include an anode. The anode can be any material that is capable of functioning as an anode in a battery and can be in any form commonly used in batteries. A bipolar plate may include an anode on a surface opposing a surface having a cathode deposited thereon and opposing cathode of either another bipolar plate or monopolar plate. A monopolar plate may have an anode deposited on a surface opposing a surface bare of either a cathode or anode, opposing a surface adjacent to an end plate, or both. The anodes are also referred to as negative active material. The anode material may include any material used in secondary batteries, including lead acid, nickel metal hydrides and lithium ion batteries. Exemplary materials useful in constructing anodes include lead, composite oxides of carbon or lithium and transition metal, (such as a composite oxide of titanium oxide or titanium and lithium) and the like. The anode material for a lead acid battery may be sponge lead. The cathode material can be in any form which allows the cathode material to function as a cathode in an electrochemical cell. Exemplary forms include formed parts, in paste form, pre-fabricated sheet or films. Paste compositions can contain a number of beneficial additives including floc or glass fibers for reinforcement, various ligano-organic compounds for paste stability and conductive additives such as carbon, particularly for negative active materials. For lead acid batteries the preferred form of the anode material is sponge lead. The anode and cathode are chosen to work together to function as an electrochemical cell once a circuit is formed which includes the cells.

The article may include one or more electrochemical cells. An electrochemical cell may be formed by a pair of opposing electrode plates with an opposing anode and cathode pair therebetween. One or more electrochemical cells may be sealed. The space of an electrochemical cell (i.e., between an opposing anode and cathode pair) may contain an electrolyte. The electrochemical cells may be sealed through one or more seals formed about one or more channels, one or more edges of the electrode plates, or both which may form closed electrochemical cells. The closed electrochemical cells may be sealed from the environment to prevent leakage and short circuiting of the cells.

The article may include an electrolyte. The electrolyte may allow electrons and ions to flow between the anode and cathode. The electrolyte may be located within the electrochemical cells. As the one or more electrochemical cells may be sealed, the electrolyte may be a liquid electrolyte. The electrolyte can be any liquid electrolyte that facilitates an electrochemical reaction with the anode and cathode utilized. The electrolytes can be water based or organic based. The organic based electrolytes useful herein comprises an electrolyte salt dissolved in an organic solvent. In lithium ion secondary batteries, it is required that lithium be contained in the electrolyte salt. For the lithium-containing electrolyte salt, for instance, use may be made of $LiPF_6$, $LiClO_4$, $LiBF_4$, $LiAsF_6$, $LiSO_3CF_3$ and $LiN(CF_3SO_2)_2$. These electrolyte salts may be used alone or in combination of two or more. The organic solvent should be compatible with the separator, cathode and anode and the electrolyte salt. It is preferable to use an organic solvent that does not decompose even when high voltage is applied thereto. For instance, it is preferable to use carbonates such as ethylene carbonate (EC), propylene carbonate (PC), butylene carbonate, dimethyl carbonate (DMC), diethyl carbonate and ethyl methyl carbonate; cyclic ethers such as tetrahydrofuran (THF) and 2-methyltetrahydrofuran; cyclic esters such as 1,3-dioxolane and 4-methyldioxolane; lactones such as γ-butyrolactone; sulfolane; 3-methylsulfolane; dimethoxyethane, diethoxyethane, ethoxymethoxymethane and ethyldiglyme. These solvents may be used alone or in combination of two or more. The concentration of the electrolyte in the liquid electrolyte should preferably be 0.3 to 5 mol/l. Usually, the electrolyte shows the highest conductivity in the vicinity of 1 mol/l. The liquid electrolyte should preferably account for 30 to 70 percent by weight, and especially 40 to 60 percent by weight of the electrolyte. Aqueous electrolytes comprise acids or salts in water which enhance the functioning of the cell. Preferred salts and acids include sulfuric acid, sodium sulfate or potassium sulfate salts. The salt or acid is present in a sufficient amount to facilitate the operation of the cell. The concentration may be about 0.5 weight percent of greater based on the weight of the electrolyte, about 1.0 or greater or about 1.5 weight percent or greater. A preferred electrolyte in a lead acid battery is sulfuric acid in water. The electrolyte may be able to pass through a separator of an electrochemical cell.

The article may include one or more separators. The one or more separators may function to partition an electrochemical cell (i.e., separate a cathode an electrochemical cell from an anode of an electrochemical cell); prevent short circuiting of the cells due to dendrite formation; functions to allow liquid electrolyte, ions, electrons or any combination of these elements to pass through it; or any combination thereof. Any known battery separator which performs one or more of the recited functions may be utilized in the assemblies of the invention. One or more separators may be located between anode and a cathode of an electrochemical cell. One or more separators may be located between a pair of adjacent electrode plates, which may include between bipolar plates or between a bipolar plate and a monopolar plate. The separator may be prepared from a non-conductive material, such as porous polymer films, glass mats, porous rubbers, ionically conductive gels or natural materials, such as wood, and the like. The separator may contain pores or tortuous paths through the separator which allows electrolyte, ions, electrons or a combination thereof to pass through the separator. Among exemplary materials useful as separators are absorbent glass mats, and porous ultra-high molecular weight polyolefin membranes and the like. The separators may be attached about their periphery and/or interior to one or more end plates, electrode plates, other separators, or any combination thereof. The separators may receive one or more attachment mechanisms, posts, or both. For example, one or more attachment mechanisms and/or posts extending through a stack of one or more end plates, one or more electrode plates, and/or one or more separators may retain a stack of a plurality of electrode plates and one or more separators together. One or more attachment mechanisms may be located about a periphery of the separator, immediately adjacent a frame of a separator, between a frame and an opening of a separator, or any combination thereof. The separators may have an area that is greater than the area of the adjacent cathode and anode. The separator may completely separate the cathode portion of the cell from the anode portion of the cell. The edges of the separator may contact peripheral edges of adjacent electrode plates, which may not have an anode or cathode disposed thereupon, so as to completely separate the anode portion of the cell from the cathode portion of the cell.

One or more separators may include frames. The frames may function to match with the edges or frames of adjacent electrode plates and form a seal between the electrochemical cells and the outside of the battery. The frame may be attached to or integral with a separator. The frame can be attached to the separator about the periphery of the sheet forming the separator using any means that bonds the separator to the frame and which can withstand exposure to the electrolyte solution. For example, the frame may be attached by adhesive bonding, melt bonding or molding the frame about the periphery of the separator. The frame can be molded in place by any known molding technic, for example thermoforming, injection molding, roto molding, blow molding, compression molding and the like. The frame may be formed about the separator sheet by injection molding. The frame may contain a raised edge adapted to match raised edges disposed about the periphery of the substrates for the electrode plates. Raised edges in one or both of the electrode plate substrates and the frames of the separators can be matched to form a common edge for the battery stack and to enhance the seal between the electrochemical cells and the outside of the battery. To seal about edges of the plurality of electrode plates and one or more separators to prevent leakage of an electrolyte and evolved gasses from the electrochemical cells, isolate the electrochemical cells to prevent short-circuiting, the article may be sealed using an endo or exoskeleton sealing system as disclosed in commonly owned US Patent Publication Nos. 2010/0183920, 2014/0349147, 2015/0140376, and 2016/0197373 incorporated in their entirety by reference.

The separators may have one or more inserts and/or bosses. The inserts and/or bosses may be integrated into the separator. The one or more inserts and/or bosses may be aligned with one or more inserts and/or bosses of one or more electrode plates, end plates, or both. The one or more inserts and/or bosses may define one or more channels passing through the one or more electrode plates, end plates, and/or separators (i.e., through the stack). One or more inserts and/or bosses may be formed by any known means and are preferably molded in place, preferably by injection molding. Where a separator has both inserts and/or bosses and a frame, the parts may be molded in one step, for instance by injection molding. The inserts and/or bosses of one or more separators may contain one or more vent holes. The one or more vent holes may allow communication of selected fluids from one or more electrochemical cells to one or more channels. Each of the electrochemical cells may be independently electrochemically formed.

The plurality of electrode plates and/or separators may include one or more openings. The openings may function to form one or more channels, house one or more seals, affix one or more electrode plates to one or more end plates, or any combination thereof. The one or more openings may be formed in the electrode plates and separators. One or more openings of an electrode plate may align (i.e., be substantially concentric) with one or more openings of one or more end plates, one or more other electrode plates, substrates, or any combination thereof. The one or more openings may align in a transverse direction across the length of the article. The transverse direction may be substantially parallel to a longitudinal axis of the article. The transverse direction may be substantially perpendicular the opposing surfaces of the substrates upon which a cathode and/or anode may be deposited. The openings may be machined (e.g., milled), formed during fabrication of the substrate (e.g., by a molding or shaping operation), or otherwise fabricated. The openings may have straight and/or smooth internal walls or surfaces. The size and frequency of the openings formed in the substrate may affect the resistivity of the battery. The one or more openings may have a diameter able to receive a post therethrough. The openings may have a diameter of about 0.2 mm or greater, about 1 mm or greater, about 2 mm or greater, or even about 5 mm or greater. The openings may have a diameter of about 30 mm or less, about 25 mm or less, or even about 20 mm or less. One or more openings of an electrode plate and/or substrate may have a larger diameter than one or more other openings of the same electrode plate and/or substrate. An opening may be about at least about 1.5 times, at least about 2 times, or even at least about 2.5 times larger than another opening. An opening may be about 4 times or less, about 3.5 times or less, or even about 3 times or less larger than another opening. The openings may be formed having a density of at least about 0.02 openings per $cm^2$. The openings may be formed having a density of less than about 4 openings per $cm^2$. The openings may be formed having a density from about 2.0 openings per $cm^2$ to about 2.8 openings per $cm^2$.

One or more openings of one or more end plates, electrode plates, and/or substrates may be filled with an electrically conductive material, e.g., a metallic-containing material. The electrically conductive material may be a material that undergoes a phase transformation at a temperature that is below the thermal degradation temperature of the substrate so that at an operating temperature of the battery assembly that is below the phase transformation temperature, the dielectric substrate has an electrically conductive path via the material admixture between the first surface and the second surface of the substrate. Further, at a temperature that is above the phase transformation temperature, the electrically conductive material admixture undergoes a phase transformation that disables electrical conductivity via the electrically conductive path. For instance, the electrically conductive material may be or include a solder material, e.g., one comprising at least one or a mixture of any two or more of lead, tin, nickel, zinc, lithium, antimony, copper, bismuth, indium or silver. The electrically conductive material may be substantially free of any lead (i.e., it contains at most trace amounts of lead) or it may include lead in a functionally operative amount. The material may include a mixture of lead and tin. For example, it may include a major portion tin and a minor portion of lead (e.g., about 55 to about 65 parts by weight tin and about 35 to about 45 parts by weight lead). The material may exhibit a melting temperature that is below about 240° C., below about 230° C., below about 220° C., below 210° C. or even below about 200° C. (e.g., in the range of about 180 to about 190° C.). The material may include a eutectic mixture. A feature of using solder as the electrically conductive material for filling the openings is that the solder has a defined melting temperature that can be tailored, depending on the type of solder used, to melt at a temperature that may be unsafe for continued battery operation. Once the solder melts, the substrate opening containing the melted solder is no longer electrically conductive and an open circuit results within the electrode plate. An open circuit may operate to dramatically increase the resistance within the bipolar battery thereby stopping further electrical flow and shutting down unsafe reactions within the battery. Accordingly, the type of electrically conductive material selected fill the openings can vary depending on whether it is desired to include such an internal shut down mechanism within the battery, and if so at what temperature it is desired to effect such an internal shutdown. The substrate will be configured so that in the event of operating conditions that exceed a predetermined condition, the substrate will function to disable operation of the battery by disrupting electrical conductivity through the substrate. For example, the electrically conductive material filling holes in a dielectric substrate will undergo a phase transformation (e.g., it will melt) so that electrical conductivity across the substrate is disrupted. The extent of the disruption may be to partially or even entirely render the function of conducting electricity through the substrate disabled.

The article may include one or more channels. The one or more channels may function as one or more venting, filling, and/or cooling channels; house one or more posts, distribute one or more posts throughout an interior of the battery assembly; prevent liquid electrolyte from coming into contact with one or more posts or other components; or any combination thereof. The one or more channels may be formed by one or more openings of one or more end plates, electrode plates, and/or separators which are aligned. The one or more channels may be referred to as one or more integrated channels. The one or more channels may pass through one or more electrochemical cells, which may also include pass through a liquid electrolyte. The channels may be sealed to prevent electrolytes and gasses evolved during operation from entering the channels. Any method of sealing which achieves this objective may be utilized. One or more seals, such as inserts and/or bosses, of the one or more end plates, electrode plates, and separators may interlock and surround one or more channels to prevent the liquid electrolyte from leaking into one or more channels. The one or more channels may pass through the article in a transverse direction to form one or more transverse channels. The size and shape of the channels can be any size or shape which allows them to house one or more posts. The shape of the channels may be round, elliptical or polygonal, such as square, rectangular, hexagonal and the like. The size of the channels housing one or more posts is chosen to accommodate the posts used. The diameter of the channel may be equal to the diameter of the openings which align to form one or more channels. The one or more channels comprise a series of openings in the components arranged so a post can be placed in the channel formed, so a fluid can be transmitted through the channel for cooling, and/or for venting and filling. The number of channels is chosen to support the end plate and edges of the end plates, electrode plates, and substrates to prevent leakage of electrolytes and gasses evolved during operation and to prevent the compressive forces arising during operation from damaging components and the seal for the individual electrochemical cells. A plurality of channels may be present so as to spread out the compressive forces generated during operation. The number and design of channels is sufficient to minimize edge-stress forces that exceed the fatigue strength of the seals. The locations of a plurality of channels are chosen so as to spread out the compressive forces generated during operation. The channels may be spread out evenly through the stack to better handle the stresses. The plurality of channels may have a cross-sectional size of about 2 mm or greater, about 4 mm or greater or about 6 mm or greater. The upper limit on the cross-sectional size of the channels is practicality, if the size is too large the efficiency of the assemblies is reduced. The channels may have a cross-sectional size of about 30 mm or less, about 25 mm or less, or even about 20 mm or less.

The article may comprise a seal between one or more channels and one or more posts. One or more seals may be located in a channel, about an exterior of a channel, and/or about a post. The seal may comprise any material or form that prevents electrolyte and gasses evolved during operation from leaking from the electrochemical cells. The seal can be a membrane, sleeve or series of matched inserts and/or bosses in the end plates, electrode plates, and/or separators or inserted in the channel. The membrane can be elastomeric. The channel can be formed by a series of sleeves, bushings, inserts and/or bosses, inserted or integrated into the plates and/or separators. The inserts and/or bosses may be compressible or capable of interlocking with one another to form a leak proof seal along the channel. The inserts and/or bosses may be formed in place in the electrode plates and/or separators, such as by molding them in place. The inserts and/or bosses may be molded in place by injection molding. The seal can be prepared from any material that can withstand exposure to the electrolyte, operating conditions of the electrochemical cells and forces exerted by inserting the post or by the post in the channel. The preferred polymeric materials that are described as useful for the posts and the substrates. The seal may be formed by sleeves, inserts or bushings placed between the bipolar and monopolar plates. The sleeves or inserts can relatively rigid and the bushings will generally be elastomeric. The inserts, bosses, sleeves and\or bushings may be adapted to fit within indentations in the bipolar and monopolar plates and/or separators or to have ends that insert into the openings of the plates creating one or more channels. The dual polar, bipolar and monopolar plates can be formed or machined to contain matching indents for the bosses, inserts, sleeves and/or the bushings. Assembly of the stack of plates with the bosses, inserts, sleeves or bushings may create interference fits to effectively seal the channels. Alternatively the bosses, inserts, sleeves and/or bushings may be melt bonded or adhesively bonded to the plates so as from a seal at the junction. Alternatively the bosses, inserts, sleeves and/or bushings may be coated in the inside with a coating which functions to seal the channel. As mentioned above the posts can function to seal the channels. It is contemplated that a combination of these sealing solutions may be utilized in single channel or in different channels. The components of the stack of plates, including dual polar, monopolar plates and bipolar plates, preferably have the same shape and common edges. This facilitates sealing of the edges. Where separators are present they generally have a similar structure as the electrode plates to accommodate the formation or creation of the transverse channels. In another embodiment the seal may be a thermoset polymer, such as an epoxy, polyurethane or acrylic polymer injected between the bolt and the transverse channel. One or more channels may be formed by inserts, bosses, sleeves and/or bushings bonded to, in openings, and/or integral with openings in one or more electrode plates and/or one or more separators. One or more posts in one or more channels may apply sufficient pressure to hold inserts, holes, bosses, sleeves and/or bushings in place to form a sealed passage. The one or more channels may be formed from inserts and/or bosses bonded and/or integrated into one or more electrode plates and one or more separators. One or more posts may be bonded to one or more inserts, bosses and/or substrates of the battery by an adhesive bond or by fusion of thermoplastic polymers or both. The inserts and/or bosses may be inserted one or more electrode plates and/or separators by interference fit or bonded in place by an adhesive. Inserts and/or bosses in one or more separators may contain one or more vent holes that may allow communication between one or more electrochemical cells and one or more channels. One or more vent holes may allow transmission of gasses from one or more electrochemical cells to one or more channels and prevent the transmission of one or more liquids (i.e., an electrolyte) from one or more electrochemical cells to one or more channels.

The article may include a membrane. The membrane may function to seal about the edges of one or more end plates, plurality of electrode plates, one or more separators, one or more channels, or any combination thereof. The membrane may be bonded to the edges of the one or more end plates, plurality of electrode plates, and/or one or more separators by any means that seals the edges of the end plates, electrode plates, and separators and isolates the one or more electrochemical cells. Exemplary bonding methods comprise adhesive bonding, melt bonding, vibration welding, RF welding, and microwave welding among others. The membrane may be a sheet of a polymeric material which material can seal the edges of the end plates, monopolar plates, and bipolar plates and can withstand exposure to the electrolyte and the conditions the battery is exposed to internally and externally. The same materials useful for the substrate of the electrode plates may be utilized for the membrane. The membrane may be a thermoplastic polymer that can be melt bonded, vibration welded or molded about the substrates of the monopolar and bipolar plates. The same thermoplastic polymer may be utilized for the monopolar and bipolar substrates and the membranes. Exemplary materials are polyethylene, polypropylene, ABS and, polyester, with ABS most preferred. The membranes may be the size of the side of the stacks to which they are bonded and the membranes are bonded to each side of the stack. The edges of the adjacent membranes may be sealed. The edges can be sealed using adhesives, melt bonding or a molding process. The membranes may comprise a single unitary sheet which is wrapped about the entire periphery of the stack. The leading edge of the membrane, first edge contacted with the stack, and the trailing edge of the stack, end of the membrane sheet applied, are may be bonded to one another to complete the seal. This may be performed by use of an adhesive, by melt bonding or a molding process. In melt bonding the surface of the membrane and/or the edge of the stack are exposed to conditions at which the surface of one or both becomes molten and then the membrane and the edge of the stack are contacted while the surfaces are molten. The membrane and edge of the stack bond as the surface freezes forming a bond capable of sealing the components together. The membrane may be taken from a continuous sheet of the membrane material and cut to the desired length. The width of the membrane may match the height of the stacks of monopolar and bipolar plates. The membrane has sufficient thickness to seal the edges of the stack of monopolar and bipolar sheets to isolate the cells. The membrane may also function as a protective case surrounding the edges of the stack. The membrane may have a thickness of about 1 mm or greater, about 1.6 mm or greater or about 2 mm or greater. The membrane may have a thickness of about 5 mm or less, 4 mm or less or about 2.5 mm or less. When the membrane is bonded to the edge of the stack, any adhesive which can withstand exposure to the electrolyte and the conditions of operation of the cell may be used. Exemplary adhesives are plastic cements, epoxies, cyanoacrylate glues or acrylate resins. Alternatively, the membrane may be formed by molding a thermoplastic or thermoset material about a portion of, or all of, the stack of electrode plates. Any known molding method may be used including thermoforming, reaction injection molding, injection molding, roto molding, blow molding, compression molding and the like. The membrane may be formed by injection molding the membrane about a portion of or all of the stack of electrode plates. Where the membrane is formed about a portion of the stack of the plates it may be formed about the edges of the electrode plates or electrode plates and the separator.

The article may include one or more posts. The one or more posts may function to hold the stack of components together in a fashion such that damage to components or breaking of the seal between the edges of the components of the stack is prevented, ensure uniform compression across the separator material, and ensure uniform thickness of the separator material. The one or more posts may have on each end an overlapping portion which engages the outside surface of opposing end plates, such as a sealing surface of each end plate. The overlapping portion may function to apply pressure on outside surfaces of opposing end plates in a manner so as to prevent damage to components or breaking of the seal between the edges of the components of the stack, and prevent bulging or other displacements of the stack during battery operation. The overlapping portion may be in contact with a sealing surface of an end plate. The stack may have a separate structural or protective end-piece over the monopolar endplate and the overlapping portion will be in contact in with the outside surface of the structural or protective end-piece. The overlapping portion can be any structure that in conjunction with the post prevents damage to components or breaking of the seal between the edges of the components of the stack. Exemplary overlapping portions include bolt heads, nuts, molded heads, brads, cotter pins, shaft collars and the like. The posts are of a length to pass through the entire stack and such length varies based on the desired capacity of the battery. The posts may exhibit a cross-section shape and size so as to fill a channel. The posts may have a cross-sectional size greater than the cross-sectional size of one or more channels so that the posts form an interference fit one or more of the channels. The number of posts is chosen to support the end plate and edges of the substrates to prevent leakage of electrolytes and gasses evolved during operation and to prevent the compressive forces arising during operation from damaging components and the seal for the individual electrochemical cells, and to minimize edge-stress forces that exceed the fatigue strength of the seals. The plurality of posts may be present so as to spread out the compressive forces generated during operation. There may be fewer posts than channels where one or more of the channels are utilized as cooling channels or vent/fill channels. For example, there may be four channels with three channels having a post located therein and one channel may be used as a cooling, vent, and/or fill channel. The posts may comprise any material that performs the necessary functions. If the post is utilized to seal the channels then the material used is selected to withstand the operating conditions of the cells, will not corrode when exposed to the electrolyte and can withstand the temperatures and pressures generated during operation of the cells. Where the posts perform the sealing function the posts may comprise a polymeric or ceramic material that can withstand the conditions recited. In this embodiment the material must be non-conductive to prevent shorting out of the cells. The posts may comprise a polymeric material such as a thermoset polymer or a thermoplastic material. The posts may comprise a thermoplastic material. Exemplary thermoplastic materials include ABS (acrylonitrile-butadiene-styrene copolymers), polypropylene, polyester, thermoplastic polyurethanes, polyolefins, compounded thermoplastic resins, polycarbonates and the like. ABS is most preferred. Where the channels are separately sealed the posts can comprise any material that has the structural integrity to perform the desired functions. The polymeric materials recited above, ceramics and metals may be utilized. Suitable metals may be steel, brass aluminum, copper and the like. The posts can comprise molded posts, threaded posts or posts with one or more end attachments. The posts may be bonded to parts of the stacks, for example the substrates, inserts or bosses in the channels, and the like. The bonds can be formed from adhesives or fusion of the polymeric materials, such as thermoplastic materials. Where the parts are threaded the structural parts of the stack are threaded to receive the threaded posts. Posts can have a head on one end and a nut, hole for a brad or cotter pin on the other or may have a nut, hole for a brad or cotter pin on both ends. This is generally the case for non-molded posts. The posts may be constructed in such a way as to be a one way ratcheting device that allows shortening, but not lengthening. Such a post would be put in place, then as the stack is compressed, the post is shortened so that it maintains the pressure on the stack. The post in this embodiment may have ridges that facilitate the ratcheting so as to allow the posts to function as one part of a zip tie like structure. Matching nuts and/or washers may be used with posts so as to compress the plates they are adjacent to when in place. The nuts and/or washers go one way over the posts and ridges may be present to prevent the nuts and/or washers from moving the other direction along the posts. In use the holes in the posts will have the appropriate brads, cotter pins and the like to perform the recited function. If the post is molded is can be molded separately or in place. If molded in place, in situ, a seal needs to be present in the channel to hold the molten plastic in place. A nonconductive post which is threaded may be used and can provide the necessary seal. Alternatively a pre-molded nonconductive polymeric post may be designed to form an interference fit in the channel in a manner so as seal the channels. The posts may be formed in place by molding, such as by injection molding.

The article may include one or more valves. The one or more valves may function to draw a vacuum from an interior of the battery assembly, fill the battery assembly with an electrolyte, and/or vent the battery assembly during operation. The one or more valves may include a pressure release valve, check valve, fill valve, pop valve, and the like, or any combination thereof. The one or more valves may be connected to and/or in communication with one or more channels formed by one or more openings of an end plate, electrode plate, separator, or any combination thereof. The one or more valves may be in communication with a channel, such as a channel having a post there through or free of a post. The article may include one or more valves as described in US 2014/0349147, incorporated herein by reference.

The article may include one or more terminals. The one or more terminals may function to transmit the electrons generated in the electrochemical cells to a system that utilizes the generated electrons in the form of electricity. The one or more terminals may pass through one or more end plates, one or more electrode plates, a membrane, and/or a case. The one or more terminals may pass through an electrode plate from an end plate to the outside or passing through the side of the case or membrane about the assembly essentially parallel to the plane of the end plates. The terminal matches the polarity of the anode or cathode of the monopolar plate. The cathode of the monopolar plate and the cathodes of one or more of the bipolar plates with a cathode current collector may be connected to independent positive terminals. The anode of the monopolar plate and the anodes of one or more of the bipolar plates with an anode current collector may be connected to independent negative terminals. The cathode current collectors may be connected and the anode current collectors may be connected in parallel. The individual terminals may be covered in a membrane leaving only a single connected positive and a single connected negative terminal exposed.

The assembly may contain one or more pairs of conductive terminals, each pair connected to a positive and negative terminal. The terminals are adapted to connect each battery stack to a load, in essence a system that utilizes the electricity generated in the cell. The terminals are in contact with the conductive conduits in the assemblies. The assembly may contain pressure release valves for one or more of the cells to release pressure if the cell reaches a dangerous internal pressure. The pressure release valves are designed to prevent catastrophic failure in a manner which damages the system the battery is used with. Once a pressure release valve is released the battery is no longer functional. The assemblies disclosed may contain a single check valve which releases pressure from the entire assembly when or before a dangerous pressure is reached.

The sealed stack may be placed in a case to protect the formed battery. Alternatively the membrane in conjunction with a protective covering over the monopolar plates at the end of the stack may be used as a case for the battery. The monopolar plates may have an appropriate protective cover attached or bonded to the surface opposite the anode or cathode. The cover may be the same material as the membrane or a material that can be adhesively bonded or melt bonded to the membrane and can have a thickness within the range recited for the membranes. If affixed to the end of the plates the cover can be affixed with any mechanical attachment including the posts having overlapping portions. The case may be formed by molding a membrane about the stacks of electrode plates and/or the opposite sides of the monopolar plates.

The assemblies disclosed are attached to a load and a circuit is formed which includes the cells. Electrons are flowed to the terminals and to the load, a system using the electricity. This flow is maintained as long as the cells can generate electricity. If the stack of cells becomes fully discharged the battery needs to undergo a charging step before additional use. If the substrate for the bipolar plates contains an electrically conductive material admixture at an operating temperature of the battery assembly that is below its phase transformation temperature, the substrate has an electrically conductive path via the material admixture, between a first surface and an opposing second surface of the substrate, and at a temperature that is above the phase transformation temperature of the conductive material admixture, the electrically conductive material admixture undergoes a phase transformation that disables electrical conductivity via the electrically conductive path. This allows the disabling of the battery before untoward consequences occur. Once a battery is discharged it may be recharged by forming a circuit with a source of electrons. During charging the electrodes change function and the anodes during discharge become cathodes and the cathodes during discharge become anodes. In essence the electrochemical cells flow electrons and ions in opposite directions as compared to discharge.

The article may be able to withstand internal pressures while or after drawing an internal vacuum without deforming, warping, leaking, or cracking due to reinforcement from one or more end plates. Internal pressures while or after drawing an internal vacuum, before filling with an electrolyte, and/or before operating the article may include an evacuation of about 5 psi or greater, about 10 psi or greater, or even about be 15 psi or greater. Internal pressures while or after drawing an internal vacuum, before filling with an electrolyte, and/or before operating the article may include an evacuation of about 30 psi or less, about 25 psi or less, or even about be 20 psi or less. The article may be able to withstand internal pressures during operation of about of 10 psi or greater without leaking or warping due to the internal pressures, about 20 psi or greater, about 50 psi or greater and about 100 psi or less. The assemblies may be able to withstand internal pressures of about 6 to about 10 psi during operation. The assemblies may provide an energy density of about 34 watt hours per kilogram, about 40 watt hours per kilogram or about 50 watt hours per kilogram. The assemblies of the invention can generate any voltage desired, such as 6, 12, 24, 48 or 96 volts. The voltage can be higher although about 200 volts is a practical upper limit.

The article of the disclosure may include any of the features described in US Publication Nos. 2014/0349147, 2015/0140376, 2016/0197373, incorporated herein by reference in their entirety.

Illustrative Embodiments

The following descriptions of the Figures are provided to illustrate the teachings herein, but are not intended to limit the scope thereof. Features of any one embodiment may be employed in another.

FIG. 1 illustrates an end plate 10. The end plate 10 includes an internal reinforcement structure 12. The internal reinforcement structure 12 includes a plurality of ribs 14 projecting from a base 15. The plurality of ribs 14 include an outer reinforcement rib 16 about the periphery of the end plate 10. The plurality of ribs 14 include a plurality of latitudinal ribs 18 and longitudinal ribs 20. The latitudinal ribs 18 are substantially perpendicular to the longitudinal ribs 20. The plurality of ribs 14 form a plurality of cells 22 which expose the base 15 between the ribs 14. The end plate 10 includes a plurality of openings 24. The plurality of openings 24 includes a plurality of peripheral openings 26. Each peripheral opening 26 is at least partially surrounded by a raised boss 27 projecting from the base 15 of the end plate 10. The peripheral openings 26 are between the outer reinforcement rib 16 and a latitudinal and/or longitudinal rib 18, 20. The plurality of openings 24 further includes a plurality of internal openings 28. The internal openings 28 are disposed in the cells 22 formed between the plurality of ribs 14. The internal openings 28 extend through the base 15. The plurality of openings 24 includes a plurality of channel openings 30. Each channel opening 30 is partially surrounded by an insert 32 which projects from the base 15 of the end plate 10.

Figure 2:
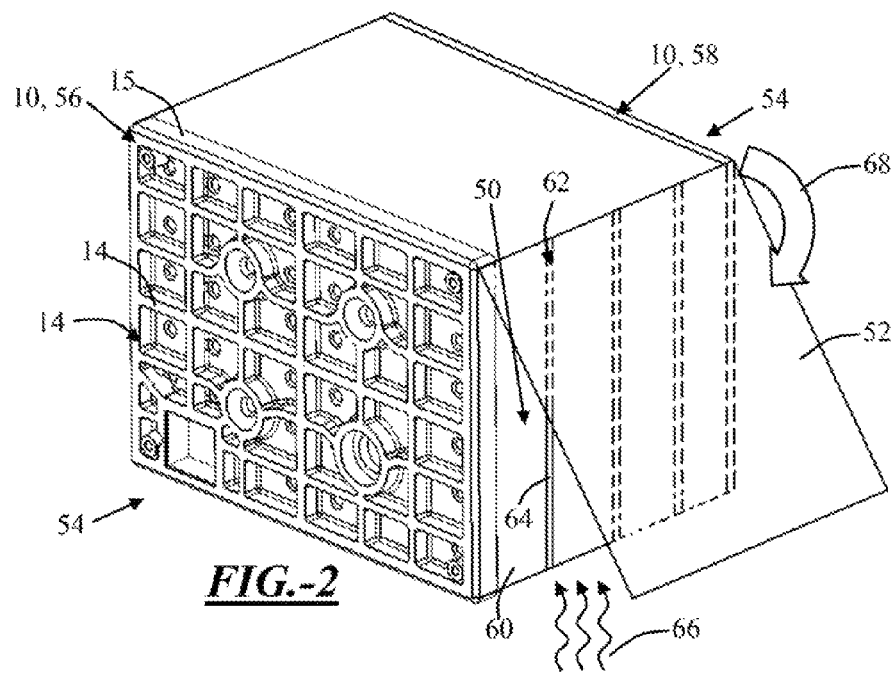
FIG. 2 is a perspective view of a battery assembly having the endplate of FIG. 1 and a membrane disposed about the periphery.

FIG. 2 shows applying a membrane 52 about an edge of a stack of electrode plates 50. Located at opposing ends 54 of the stack of electrode plates 50 are two of the end plates 10. The two end plates 10 include a first end plate 56 located at an opposing end 54 of the stack of electrode plates 50 as a second end plate 58. Each end plate 10 includes a base 15 from which a plurality of ribs 14 project to form an internal reinforcement structure 12. Disposed about the electrode plates 50 are frames 60. Sandwiched between the individual electrode plates 50 are separators 62. Disposed about each separator 62 are frames 64 for the separators. The frames 64 for the separators are between the frames 60 for the electrode plates 50. The membrane 52 is applied to the frames 60, 64 using a source of heat 66 and pressure 68 to seal the membrane 52 to the edge of the stack of electrode plates 50 and frames 60, 64.

Figure 3:
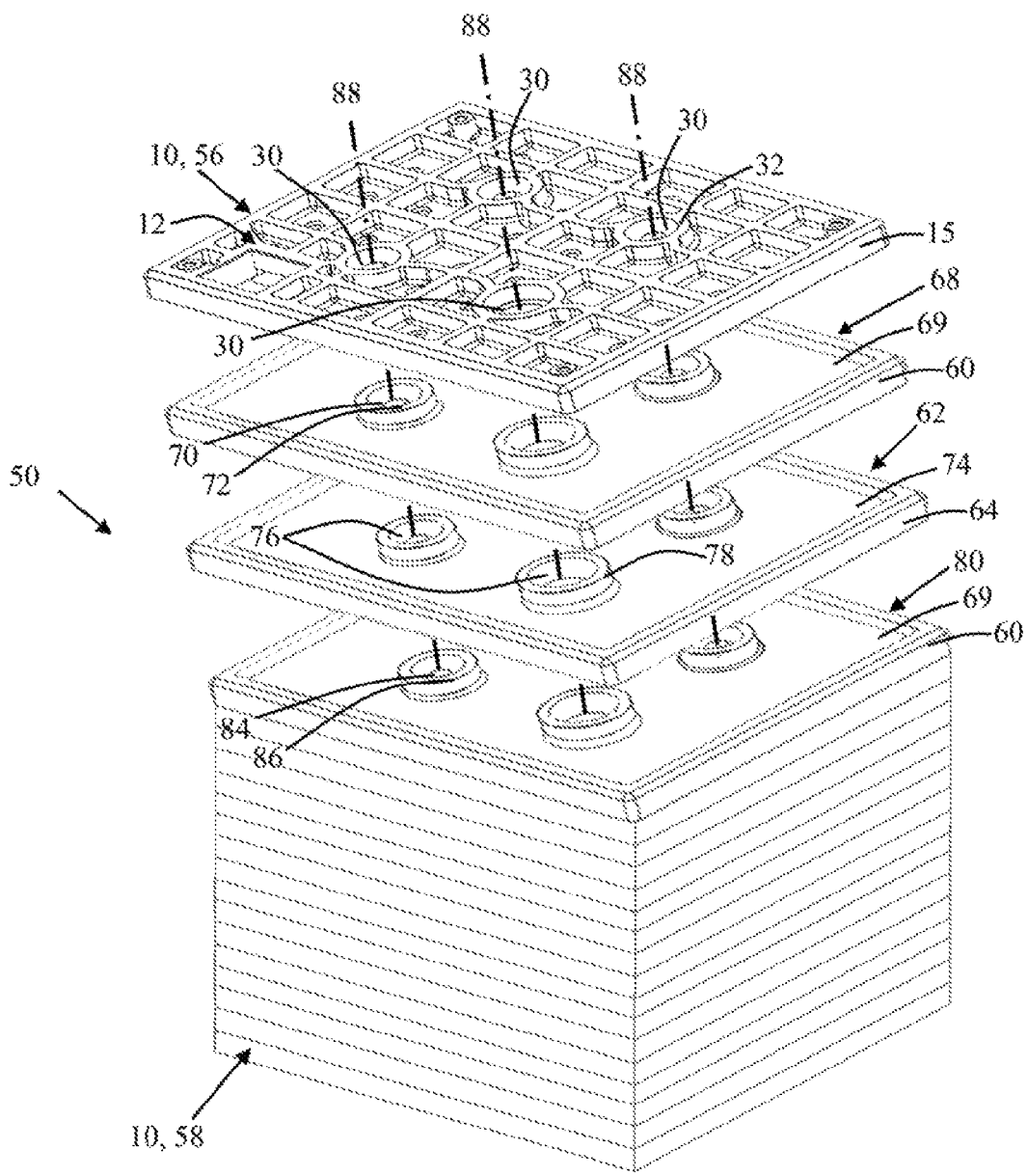
FIG. 3 illustrates a partially exploded stack of electrode plates having a first and second end plate with internal reinforcement structures.

FIG. 3 shows a partially exploded stack of electrode plates 50. Shown is an end plate 10 which is a first end plate 56. The first end plate 56 includes an internal reinforcement structure 12. The end plate 10 includes a plurality of channel openings 30. Each channel opening 30 is partially surrounded by a raised insert 32 projecting from the base 15 of the end plate 10. Adjacent to the first end plate 10, 56 is a monopolar plate 68. The monopolar plate 68 includes a substrate 69 and a frame 60. The frame 60 forms a raised edge about the periphery of the substrate 69. The monopolar plate 68 includes a plurality of channel openings 70 in the substrate 69. Each channel opening 70 is partially surrounded by a raised insert 72 projecting from the substrate 69 of the monopolar plate 68. Adjacent to the monopolar plate 68 is a separator 62. The separator 62 includes a frame 64. The frame 64 forms a raised edge about the periphery of the separator 62. The separator 62 further includes a glass mat 74 located in the interior and adjacent to the frame 64. The separator further includes a plurality of channel openings 76. Each channel opening 76 is partially surrounded by a raised insert 78 projecting from the separator 64. Adjacent to the separator 64 is a bipolar plate 80. The bipolar plate 80 includes a substrate 69 and a frame 60. The frame 60 forms a raised edge about the periphery of the substrate 60 of the bipolar plate 80. The bipolar plate 80 includes a plurality of channel openings 84. Each channel opening 84 is partially surrounded by a raised insert 86 projecting from the substrate 60 of the bipolar plate 80. The raised inserts 72, 78, 86 and channel openings 70, 76, 84 align and interlock to form one or more transverse channels 88 through the stack of electrode plates 50 and opposing end plates 56, 58. One or more of the transverse channels 88 can receive one or more posts 96 (not shown) as disclosed in US 2014/0349147, such that one or more posts 96 (not shown) extend through one or more of the transverse channels 88.

Figure 4:
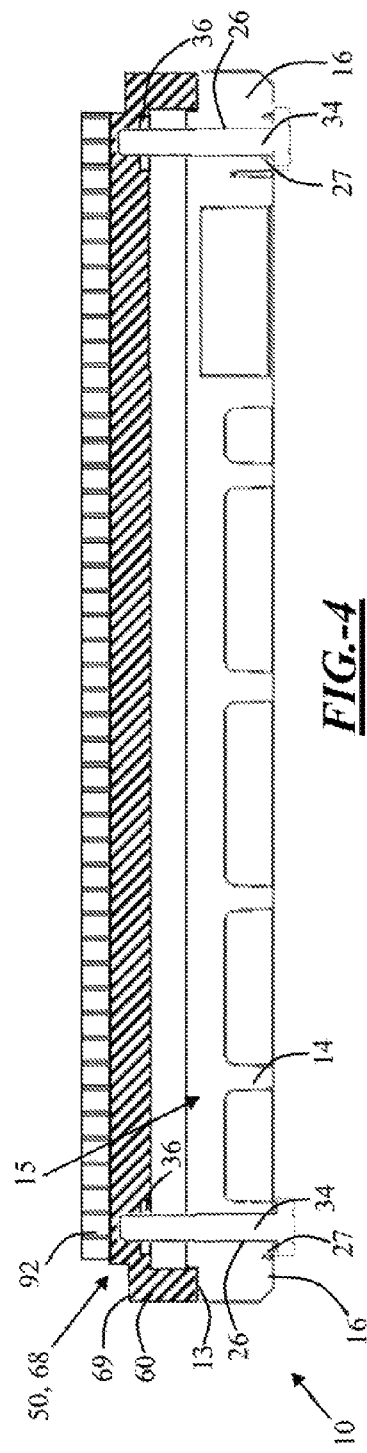
FIG. 4 illustrates a cross-section along section A-A as shown in FIG. 1 of a partial battery assembly.

FIG. 4 illustrates a cutaway of an end plate 10 along plane A-A as shown in FIG. 1, through two peripheral openings 26. The end plate 10 is affixed to an electrode plate 50, which is a monopolar plate 68, such as when the end plate 10 is assembled at an end of a stack of electrode plates 50 (not shown). The end plate 10 includes a recessed edge 13 about the periphery of the base 15. The recessed edge 13 is on the opposite surface of the base 15 as the plurality of ribs 14. The recessed edge 13 receives the frame 60 of the monopolar plate 68. The monopolar plate 68 includes a substrate 69 and an anode 92. The anode 92 is deposited on the substrate 60 on a surface opposite a surface facing the end plate 10. The end plate 10 includes a plurality of peripheral openings 26. Each of the peripheral openings 26 is located adjacent to the outer reinforcement rib 16 and partially surrounded by a raised boss 27. Extending through each peripheral opening 26 is a threaded fastener 34. The threaded fastener 34 is received within a nut 36 embedded in the substrate 69 of the monopolar plate 68. The threaded fasteners 34 cooperate with the nuts 36 to secure the end plate 10 to the monopolar plate 68 about a periphery of the end plate 10.

Figure 5:
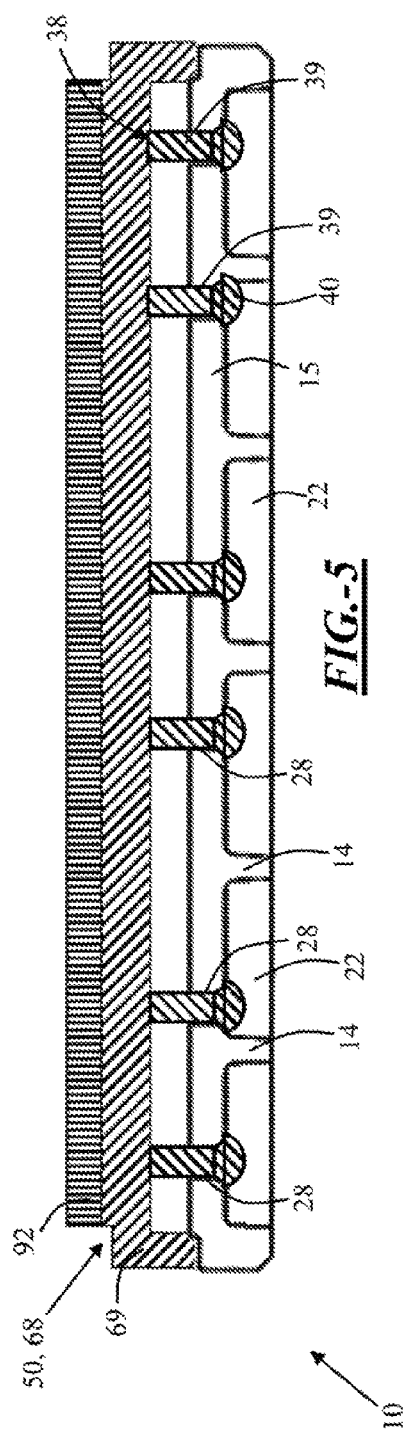
FIG. 5 illustrates a cross-section along section B-B as shown in FIG. 1 of a partial battery assembly.

FIG. 5 illustrates a cutaway of the end plate 10 along plane B-B in FIG. 1, through a plurality of internal openings 28. The end plate 10 is affixed to a monopolar plate 68, such as when assembled to a stack of electrode plates 50 (not shown). The monopolar plate 68 includes a substrate 69 and an anode 92. The anode 92 is deposited on the substrate 60 on a surface opposite a surface facing the end plate 10. The end plate 10 includes a plurality of internal openings 28. Each of the internal openings 28 is located between individual ribs 14 in cells 22. The internal openings 28 extend through the base 15. A plurality of heat stakes 38 project from the substrate 69 of the monopolar plate 68 and through the internal openings 28. The heat stakes 38 are formed as bosses 39 protruding from the monopolar plate 68. The bosses 39 are received within the internal openings 28. The bosses 39 are deformed with heat to form a head 40 on the heat stakes 38. The heat stakes 38 interlock the monopolar plate 68 with the end plate 10.

Figure 6:
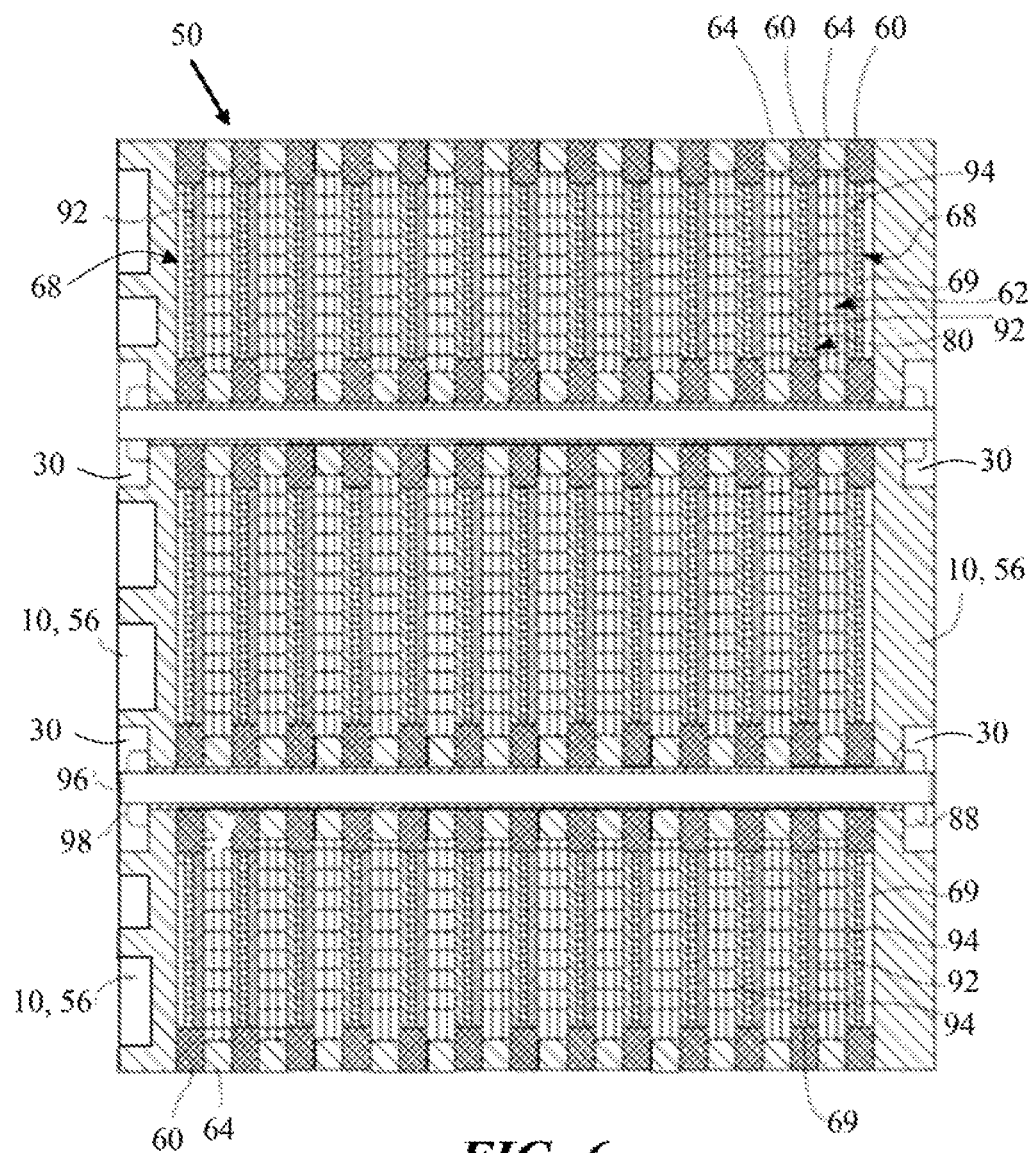
FIG. 6 illustrates a cross-section along section C-C as shown in FIG. 1 of a battery assembly.

FIG. 6 shows a cutaway along the plane shown by line C-C through the transverse channels 88 formed by the channel openings 30. Shown is a monopolar plate 68 having a substrate 69 and a cathode 94 having a frame 60 the ends of the substrate 69. Adjacent to the cathode 94 on the monopolar plate 68 is a separator 62 having a frame 64 on each end. Adjacent to separator 62 is a bipolar plate 80. The bipolar plate 80 includes an anode 92 disposed on the substrate 69 adjacent to the separator 62. The substrate 69 includes a cathode 94 disposed on the opposite surface as the anode 92. The bipolar plate 80 includes a frame 60 on each end. In this view there are number of bipolar plates 80 arranged as described. Between the bipolar plates 80 are separators 62. At the opposite end of the stack is a monopolar plate 68 having a substrate 69, with a frame 60 shown at the ends in this view and an anode 92 facing the adjacent separator 62. The stack of electrode plates 50 forms electrochemical cells with the separators 62 located in the cells. Also shown are the transverse channels 88. Posts 96 are disposed within the transverse channels 88. The posts 96 include an overlapping portion 98 formed at each end which seals the transverse channel 88.

REFERENCE NUMERAL LISTING

10 End plate
12 Internal reinforcement structure of end plate
14 Plurality of ribs of internal reinforcement structure
15 Base of end plate
16 Outer reinforcement rib
18 Latitudinal rib
20 Longitudinal rib
22 Cells
24 Plurality of openings
26 Peripheral opening
27 Raised boss
28 Internal opening
30 Channel opening
32 Raised insert for channel opening
34 Threaded fastener
36 Nut
38 Heat stakes
40 Head of heat stake
50 Stack of electrode plates
52 Membrane
54 Opposing ends of stack of electrode plates
56 First end plate
58 Second end plate
60 Frame for electrode plate
62 Separator
64 Frame for separator
68 Monopolar plate
69 Monopolar plate substrate
70 Channel openings in monopolar plate
72 Raised insert of monopolar plate
74 Glass mat
76 Channel openings in separator
78 Raised insert of separator
80 Bipolar plate
82 Frame of bipolar plate
84 Channel openings in bipolar plate
86 Raised insert of bipolar plate
88 Transverse Channels
90 Substrate of monopolar plate
92 Anode
94 Cathode Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

The invention claimed is:

1. An article comprising:
  (a) one or more stacks of a plurality of electrode plates comprising:
    (i) one or more bipolar plates comprising a substrate having an anode on one surface and a cathode on an opposing surface;
    (ii) a separator and a liquid electrolyte located between each of the electrode plates;
    (iii) a first monopolar plate having a first substrate with a cathode deposited on one surface, the first monopolar plate located at an end of the one or more stacks; and
    (iv) a second monopolar plate having a second substrate with an anode deposited on one surface, the second monopolar plate located at an opposing end of the one or more stacks as the first monopolar plate;
  (b) a first end plate having a first end plate internal reinforcement structure, attached at an end of the article, wherein the first end plate is a one-piece structure;
  (c) a second end plate having a second end plate internal reinforcement structure, attached at an opposing end of the article as the first end plate, wherein the second end plate is a one-piece structure;
    wherein the first end plate is attached about a periphery with a first plurality of peripheral attachment mechanisms and an inner surface within the periphery with a first plurality of inner attachment mechanisms to the first monopolar plate;
    the second end plate is attached about a periphery with a second plurality of peripheral attachment mechanisms and an inner surface within the periphery with a second plurality of inner attachment mechanisms to the second monopolar plate;
    wherein the first end plate and the second end plate reinforce the plurality of electrode plates during a charge cycle, a discharge cycle, or both the charge cycle and the discharge cycle;
    wherein the first end plate internal reinforcement structure is molded into the first end plate and the second end plate internal reinforcement structure is molded into the second end plate; and
    wherein the first end plate and the second end plate reinforce the plurality of electrode plates during an evacuation of about 5 psi to about 30 psi prior to filling with the liquid electrolyte to prevent inward deformation of the plurality of electrode plates.

2. The article according to claim 1, wherein the first end plate internal reinforcement structure results in the first end plate having a stiffness of about 400 ksi or greater and the second end plate internal reinforcement structure results in the second end plate having a stiffness of about 400 ksi or greater.

3. The article according to claim 1, wherein the first end plate is attached to the first monopolar plate and the second end plate is attached to the second monopolar plate so that the first monopolar plate and the second monopolar plate are prevented from substantially deforming when the article is vacuum-filled during the charge cycle.

4. The article according to claim 3, wherein the first end plate internal reinforcement structure, the second end plate internal reinforcement structure, or both include one or more rib structures.

5. The article according to claim 4, wherein the first plurality of peripheral attachment mechanisms, the first plurality of inner attachment mechanisms, the second plurality of peripheral attachment mechanisms, and the second plurality of inner attachment mechanisms include an adhesive material, a tape, a heat stake, a mechanical fastener, or a combination thereof.

6. The article according to claim 4, wherein the first plurality of peripheral attachment mechanisms and the first plurality of inner attachment mechanisms are a plurality of first heat stakes, a plurality of first mechanical fasteners, or both; and the second plurality of peripheral attachment mechanisms and the second plurality of inner attachment mechanisms are a plurality of second heat stakes, a plurality of second mechanical fasteners, or both; and
  wherein the plurality of first heat stakes, the plurality of first mechanical fasteners, or both are individually disposed between at least two or more of the rib structures of the first end plate; and the plurality of second heat stakes, the plurality of second mechanical fasteners, or both are individually disposed between at least two or more of the rib structures of the second end plate.

7. The article according to claim 1, wherein the first plurality of peripheral attachment mechanisms are a plurality of first mechanical fasteners and the second plurality of peripheral attachment mechanisms are a plurality of second mechanical fasteners; and
  wherein the first monopolar plate, the second monopolar plate, or both the first monopolar plate and the second monopolar plate include a plurality of nuts which receive the first mechanical fasteners, the second mechanical fasteners, or both.

8. The article according to claim 6, wherein the plurality of first mechanical fasteners, the plurality of first heat stakes, or a combination thereof which attach the first end plate to the first monopolar plate at the inner surface do not extend into any of the one or more bipolar plates; and
  wherein the plurality of second mechanical fasteners, the plurality of second heat stakes, or a combination thereof which attach the second end plate to the second monopolar plate at the inner surface do not extend into any of the one or more bipolar plates.

9. The article according to claim 1, wherein the one or more stacks of the plurality of electrode plates are assembled into electrochemical cells; and
  wherein the one or more stacks includes one or more openings in each of the one or more bipolar plates, the first monopolar plate, the second monopolar plate, the separator, the first end plate, and the second end plate aligned with each other in a transverse direction, the one or more openings include inserts molded therein which are aligned to form a channel which is integrated, and the inserts in the separators have vent holes which communicate between the channel and the electrochemical cells.

10. The article of claim 1, wherein one or more channels pass through the plurality of electrode plates, the first end plate, the second end plate, and the liquid electrolyte; and
wherein the one or more openings which form part of the one or more channels pass through the first end plate internal reinforcement structure, second end plate internal reinforcement structure, or both.

11. The article of claim 1, wherein the first plurality of inner attachment mechanisms and the second plurality of inner attachment mechanisms each include a plurality of heat stakes.

12. The article of claim 1, wherein the first plurality of peripheral attachment mechanisms and the second plurality of peripheral attachment mechanisms each include a plurality of threaded fasteners.

13. The article of claim 4, wherein the one or more rib structures include a plurality of rib structures in a lattice, grid, and/or honeycomb pattern.

14. The article of claim 9, wherein the first end plate internal reinforcement structure, the second end plate internal reinforcement structure, or both include a plurality of rib structures; and
wherein one or more of the plurality of rib structures intersect and/or merge with the insert and/or the opening of the first end plate, the second end plate, or both.

15. An article comprising:
(a) one or more stacks of a plurality of electrode plates comprising:
(i) one or more bipolar plates comprising a substrate having an anode on one surface and a cathode on an opposing surface;
(ii) a first monopolar plate having a cathode deposited on one surface located at an end of the one or more stacks;
(iii) a second monopolar plate having an anode deposited on one surface located at an opposing end of the one or more stacks as the first monopolar plate;
(iv) a separator and a liquid electrolyte located between each of the electrode plates;
(b) a first end plate which is a one-piece structure having a first end plate internal reinforcement structure molded therein, attached about both a periphery and an internal outer surface area of the first monopolar plate; and wherein the first end plate internal reinforcement structure results in the first end plate having a stiffness of about 400 ksi or greater;
(c) a second end plate which is a one-piece structure having a second end plate internal reinforcement structure molded therein, attached about both a periphery and an internal outer surface area of the second monopolar plate; and wherein the second end plate internal reinforcement structure results in the second end plate having a stiffness of about 400 ksi or greater;
wherein the first end plate is attached to the first monopolar plate about the periphery with a first plurality of peripheral attachment mechanisms and the internal outer surface area within the periphery with a first plurality of inner attachment mechanisms;
wherein the second end plate is attached to the second monopolar plate about the periphery with a second plurality of peripheral attachment mechanisms and the internal outer surface area within the periphery with a second plurality of inner attachment mechanisms;
wherein the first end plate and the second end plate reinforce the plurality of electrode plates during a charge cycle, a discharge cycle, or both the charge cycle and the discharge cycle; and
wherein the first end plate is separate from and affixed to the first monopolar plate and the second end plate is separate from and affixed to the second monopolar plate; and
wherein the first end plate and the second end plate are located at opposing ends of the article; and
wherein the first end plate and the second end plate reinforce the plurality of electrode plates during an evacuation of about 5 psi to about 30 psi prior to filling with the liquid electrolyte to prevent inward deformation of the plurality of electrode plates.

16. The article according to claim 15, wherein the first end plate is attached to the first monopolar plate and the second end plate is attached to the second monopolar plate so that the first monopolar plate and the second monopolar plate are prevented from substantially deforming when the article is vacuum-filled during the charge cycle.

17. The article according to claim 16, wherein the first end plate internal reinforcement structure and the second end plate internal reinforcement structure include one or more rib structures.

18. The article according to claim 17, wherein the first end plate, the second end plate, or both the first end plate and the second end plate are attached to the first monopolar plate and the second monopolar plate with an adhesive material, a tape, a heat stake, a mechanical fastener, or a combination thereof.

19. The article according to claim 17, wherein the first end plate is attached to the first monopolar plate with one or more first heat stakes, one or more first mechanical fasteners, or both; and the second end plate is attached to the second monopolar plate with one or more second heat stakes, one or more second mechanical fasteners, or both; and
wherein the one or more first heat stakes, the one or more first mechanical fasteners, or both are disposed between at least two or more of the rib structures of the first end plate; and the one or more second heat stakes, the one or more second mechanical fasteners, or both are disposed between at least two or more of the rib structures of the second end plate.

20. An article comprising:
(a) one or more stacks of a plurality of electrode plates assembled into electrochemical cells comprising:
(i) one or more bipolar plates comprising a substrate having an anode on one surface and a cathode on an opposing surface;
(ii) a first monopolar plate having a cathode deposited on one surface located at an end of the one or more stacks;
(iii) a second monopolar plate having an anode deposited on one surface located at an opposing end of the one or more stacks as the first monopolar plate;
(iv) a separator and a liquid electrolyte located between each of the electrode plates;
(b) a first end plate having a first end plate internal reinforcement structure, attached about both a periphery and an internal outer surface area of the first monopolar plate; and wherein the first end plate internal reinforcement structure results in the first end plate having a stiffness of about 400 ksi or greater;
(c) a second end plate having a second end plate internal reinforcement structure, attached about both a periphery and an internal outer surface area of the second monopolar plate; and wherein the second end plate internal reinforcement structure results in the second end plate having a stiffness of about 400 ksi or greater;

(d) one or more openings in each of the one or more bipolar plates, the first monopolar plate, the second monopolar plate, the separator, the first end plate, and the second end plate aligned with each other in a transverse direction, the one or more openings include inserts molded therein which are aligned to form a channel which is integrated and passes through the liquid electrolyte, and the inserts in the separators have vent holes which communicate between the channel and the electrochemical cells;

wherein the first end plate and the second end plate reinforce the plurality of electrode plates during a charge cycle, a discharge cycle, or both the charge cycle and the discharge cycle; and wherein the first end plate is separate from and affixed to the first monopolar plate and the second end plate is separate from and affixed to the second monopolar plate.

\* \* \* \* \*